US010775661B2

(12) United States Patent
Yeh et al.

(10) Patent No.: US 10,775,661 B2
(45) Date of Patent: Sep. 15, 2020

(54) TOUCH DISPLAY DEVICE AND MANUFACTURING METHOD THEREOF

(71) Applicant: HANNSTAR DISPLAY CORPORATION, Taipei (TW)

(72) Inventors: Cheng-Yen Yeh, Taichung (TW); Kuo-Chang Su, Tainan (TW)

(73) Assignee: HANNSTAR DISPLAY CORPORATION, Taipei (TW)

( * ) Notice: Subject to any disclaimer, the term of this patent is extended or adjusted under 35 U.S.C. 154(b) by 0 days.

(21) Appl. No.: 16/402,240

(22) Filed: May 3, 2019

(65) Prior Publication Data
US 2019/0346711 A1 Nov. 14, 2019

(30) Foreign Application Priority Data
May 9, 2018 (CN) .......................... 2018 1 0439660

(51) Int. Cl.
*G02F 1/1333* (2006.01)
*G06F 3/044* (2006.01)
*G02F 1/1362* (2006.01)
*G02F 1/1343* (2006.01)
*G06F 3/041* (2006.01)
(Continued)

(52) U.S. Cl.
CPC ........ *G02F 1/13338* (2013.01); *G02F 1/1368* (2013.01); *G02F 1/13439* (2013.01); *G02F 1/133345* (2013.01); *G02F 1/134363* (2013.01); *G02F 1/136213* (2013.01); *G02F 1/136227* (2013.01); *G02F 1/136286* (2013.01); *G06F 3/0412* (2013.01); *G06F 3/0445* (2019.05); *G02F 2001/13606* (2013.01); *G02F 2001/136295* (2013.01); *G02F 2201/121* (2013.01); *G02F 2201/123* (2013.01); *G06F 2203/04103* (2013.01)

(58) Field of Classification Search
None
See application file for complete search history.

(56) References Cited

U.S. PATENT DOCUMENTS

| 8,803,147 | B2 | 8/2014 | Shin |
| 8,933,460 | B2 | 1/2015 | Kim |
| 9,035,317 | B2 | 5/2015 | Huang |

(Continued)

FOREIGN PATENT DOCUMENTS

KR    10-2013-0067827    6/2013

*Primary Examiner* — Nicholas J Lee
(74) *Attorney, Agent, or Firm* — Winston Hsu

(57) ABSTRACT

The present invention provides a touch display device. A thin film transistor and touch signal lines are disposed on a substrate. A first insulating layer, a first transparent conductive layer and a second insulating layer are disposed on the thin film transistor and the touch signal lines in sequence, wherein the first transparent conductive layer includes pixel electrodes. First connecting holes and second connecting holes are situated in the first insulating layer and the second insulating layer, each first connecting hole exposes a portion of the pixel electrode and a portion of the drain, and each second connecting hole exposes a portion of the touch signal line. A second transparent conductive layer is disposed on the second insulating layer, and includes touch electrodes and connecting electrodes electrically insulated from each other and respectively extending into the first connecting holes and the second connecting holes.

20 Claims, 26 Drawing Sheets

(51) Int. Cl.
  *G02F 1/1368* (2006.01)
  *G02F 1/136* (2006.01)

(56) References Cited

U.S. PATENT DOCUMENTS

2010/0013789 A1\* 1/2010 Chung .................... G06F 3/044
                                                      345/174
2016/0041666 A1\* 2/2016 Lee ..................... G02F 1/13338
                                                      345/174
2018/0188581 A1\* 7/2018 Peng ................... G02F 1/13394
2019/0179440 A1\* 6/2019 Beak ................. G02F 1/134309
2019/0212855 A1\* 7/2019 Shang ............... G02F 1/136286

\* cited by examiner

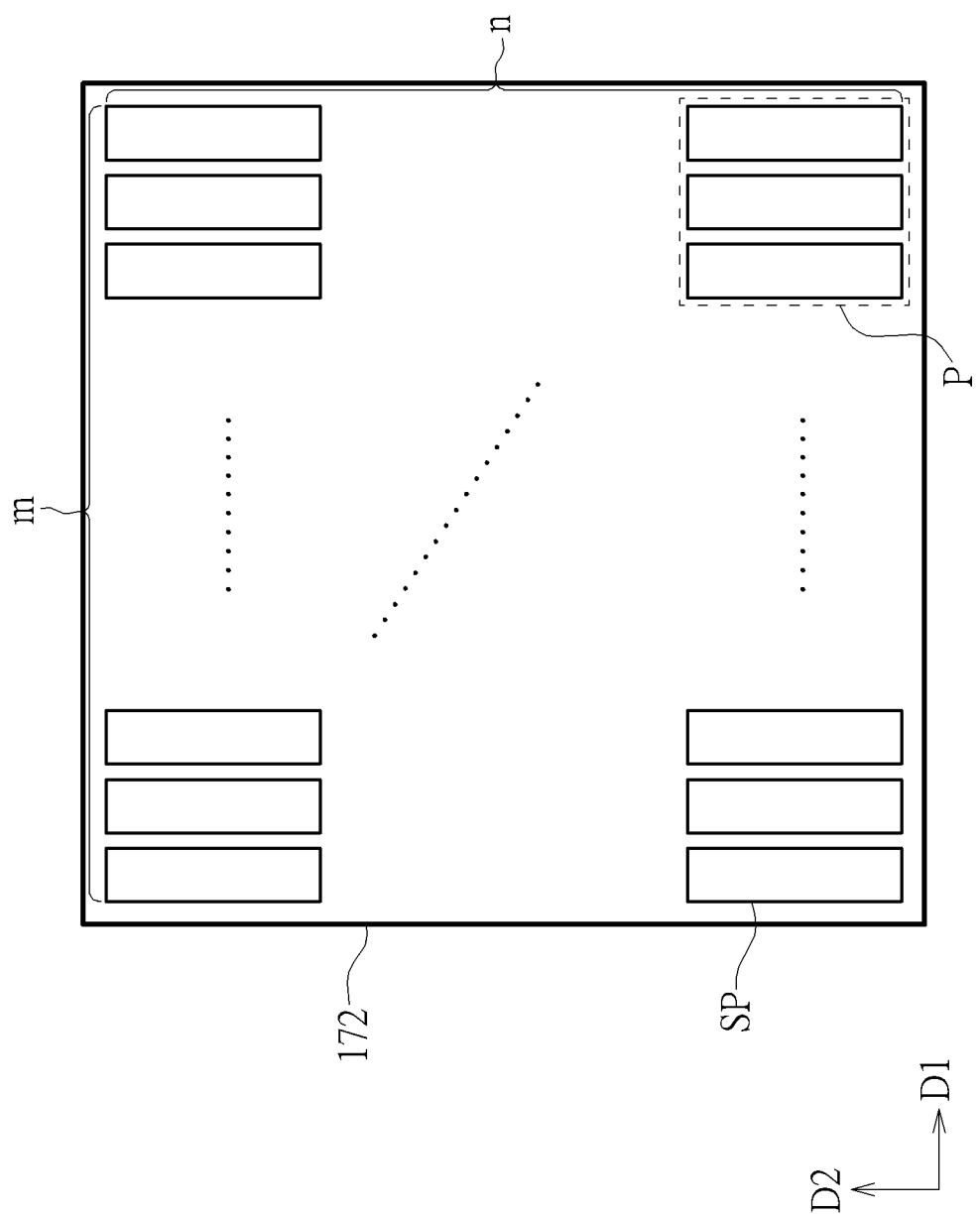

TOUCH DISPLAY DEVICE AND MANUFACTURING METHOD THEREOF

CROSS REFERENCE TO RELATED APPLICATION

This application claims the priority benefit of China Application Serial No. 201810439660.8, which was filed on May 9, 2018. The entirety of the above-mentioned patent application is hereby incorporated by reference herein and made a part of this specification.

BACKGROUND OF THE INVENTION

1. Field of the Invention

The present invention relates to a touch display device and a manufacturing method thereof, and more particularly to a touch display device and a manufacturing method for increasing capacitance of a storage capacitor.

2. Description of the Prior Art

A conventional touch display device is composed of two substrates and a plurality of layers with various electronic components disposed between the substrates for image display and touch sensing. Having the characteristics of thin appearance, low power consumption and no radiation pollution, these touch display devices have been widely used in many kinds of portable or wearable electronic products, such as notebooks, smart phones, watches, and vehicle displays, for convenient transmitting and displaying of information.

In order to enhance the resolution, a pixel size of the touch display device may be shrunk, such that a total number of pixels are increased under the condition that the size of the touch display device is not changed. As the size of the pixel shrinks, however, the overlapping area of two electrodes of the pixel is decreased, making a capacitance of a storage capacitor formed of these electrodes insufficient, such that electrical characteristics of the storage capacitor and a display quality of the touch display device are affected. Therefore, maintaining or improving the electrical characteristics of the storage capacitor needs to be achieved under the condition of enhancing the resolution of a touch display device. Moreover, a conventional touch display device has three metal layers which respectively have a trace connected to a gate of a thin film transistor, a trace connected to a source of the thin film transistor and a trace connected to a touch electrode. This complicates the manufacturing process, such that the material costs and producing time are enhanced, which influences the cost and yield.

SUMMARY OF THE INVENTION

The present invention provides a touch display device and a manufacturing method thereof for decreasing a distance between two transparent conductive layers by a film and connecting hole design, so as to increase a capacitance of a storage capacitor formed of two transparent conductive layers without affecting other loads. Furthermore, a film number of the touch display device is reduced, so as to simplify the manufacturing process and decrease the number of layers.

In order to solve the prior art problems, the present invention provides a touch display device including a substrate, a plurality of thin film transistors, a plurality of touch signal lines, a first insulating layer, a first transparent conductive layer, a second insulating layer, a plurality of first connecting holes, a plurality of second connecting holes and a second transparent conductive layer. The thin film transistors are disposed on the substrate, and each of the thin film transistors includes a gate, a source and a drain. The touch signal lines are disposed on the substrate. The first insulating layer is disposed on the thin film transistor and the touch signal lines. The first transparent conductive layer is disposed on the first insulating layer, and the first transparent conductive layer includes a plurality of pixel electrodes. The second insulating layer is disposed on the first insulating layer and the first transparent conductive layer. The first connecting holes are situated in the first insulating layer and the second insulating layer, and each of the first connecting holes exposes a portion of one of the pixel electrodes and a portion of one of the drains. The second connecting holes are situated in the first insulating layer and the second insulating layer, and each of the second connecting holes exposes a portion of one of the touch signal lines. The second transparent conductive layer is disposed on the second insulating layer, the second transparent conductive layer includes a plurality of touch electrodes and a plurality of connecting electrodes, each of the connecting electrodes extends into one of the first connecting holes, each of the touch electrodes extends into at least one of the second connecting holes, and the connecting electrodes is electrically insulated from the touch electrodes. Each of the connecting electrodes is electrically connected to one of the drains and one of the pixel electrodes, and each of the touch electrodes is electrically connected to at least one of the touch signal lines.

The present invention further provides a manufacturing method of a touch display device including the following steps: forming a plurality of thin film transistors and a plurality of touch signal lines on a substrate, each of the thin film transistors including a gate, a source and a drain, wherein the touch signal lines and the drains are formed of a same layer; forming a first insulating layer on the thin film transistors and the touch signal lines; forming a first transparent conductive layer on the first insulating layer, the first transparent conductive layer including a plurality of pixel electrodes; forming a second insulating layer on the first transparent conductive layer and the first insulating layer; removing a portion of the first insulating layer and a portion of the second insulating layer for forming a plurality of first connecting holes and a plurality of second connecting holes, each of the first connecting holes exposing a portion of one of the pixel electrodes and a portion of one of the drains, each of the second connecting holes exposing a portion of one of the touch signal lines; and forming a second transparent conductive layer on the second insulating layer, the second transparent conductive layer including a plurality of touch electrodes and a plurality of connecting electrodes, the connecting electrodes being electrically insulated from the touch electrodes, each of the connecting electrodes extending into one of the first connecting holes, each of the touch electrodes extending into at least one of the second connecting holes, wherein each of the connecting electrodes is electrically connected to one of the drains and one of the pixel electrodes, and each of the touch electrodes is electrically connected to at least one of the touch signal lines.

By using the above design, the touch display device of the present invention can reduce the distance between the touch electrode and the pixel electrode under the condition that the load between the data line and the touch electrode is not increased, so as to increase the capacitance of the storage capacitor formed of the touch electrode and the pixel electrode. Also, compared with the conventional touch display device, the manufacturing processes may be simplified and the number of layers in the touch display device may be decreased, which reduces the manufacturing cost. Moreover, the aperture ratio of the sub-pixel may be enhanced by the design of the connecting electrode. The electrical connection formed of the connecting electrode may not be influenced under the condition that the first connecting hole has an undercut structure.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 16 is a top-view schematic diagram illustrating the sub-pixels and one touch electrode according to an embodiment of the present invention.

DETAILED DESCRIPTION

Figure 1:
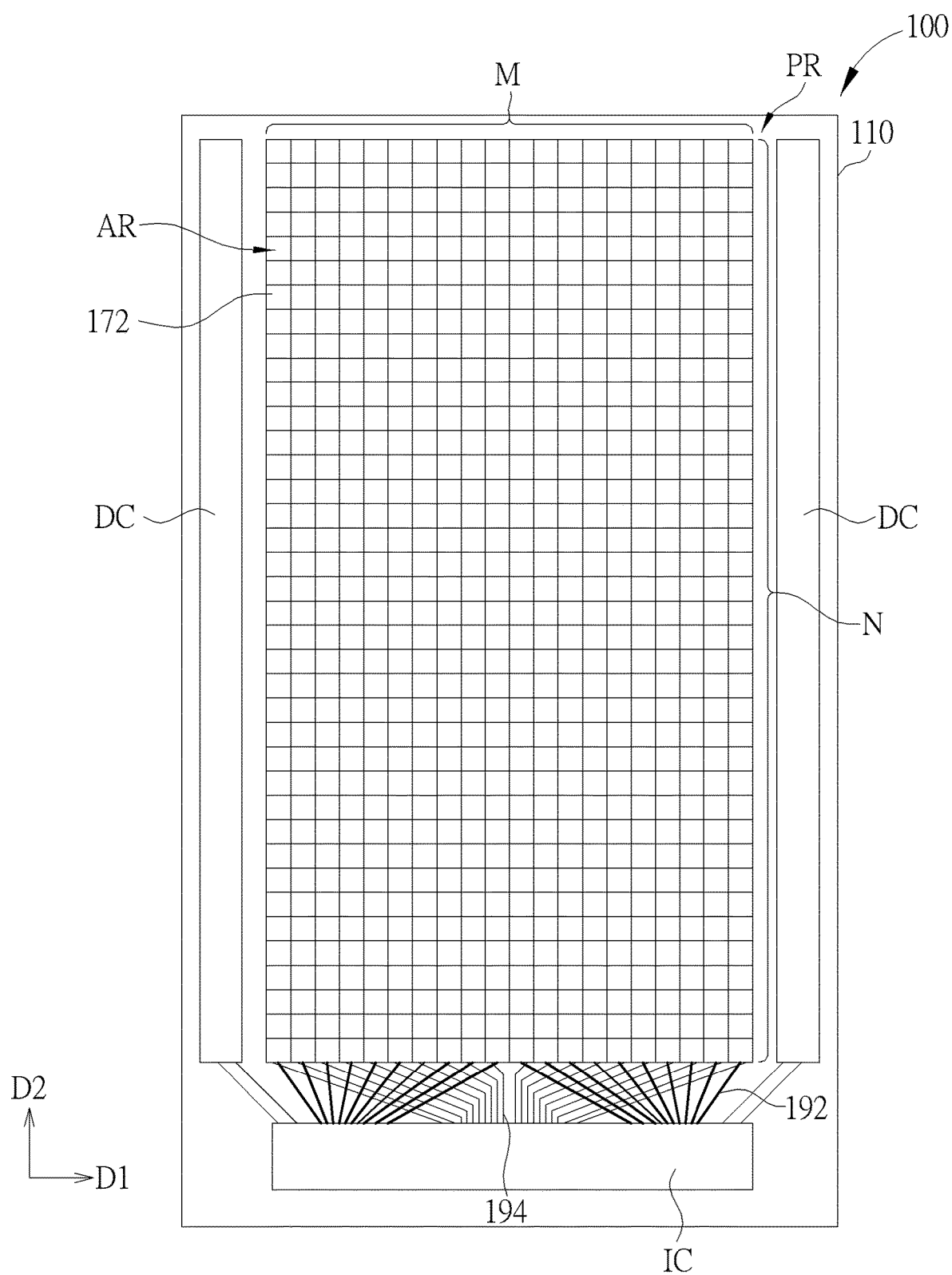
FIG. 1 is a top-view schematic diagram illustrating a touch display device according to an embodiment of the present invention.

To provide a better understanding of the present invention to those skilled in the art, preferred embodiments will be detailed in the follow description. The preferred embodiments of the present invention are illustrated in the accompanying drawings with numbered elements to elaborate on the contents and effects to be achieved. It should be noted that the drawings are simplified schematics, and therefore show only the components and combinations associated with the present invention, so as to provide a clearer description for the basic structure or implementing method of the present invention. The components would be more complex in reality. In addition, for ease of explanation, the components shown in the drawings may not represent their actual number, shape, and dimensions; details may be adjusted according to design requirements.

FIG. 1 is a top-view schematic diagram illustrating a touch display device according to an embodiment of the present invention. The touch display device 100 of the present invention is an in-cell touch liquid-crystal display device, but not limited thereto. As shown in FIG. 1, the touch display device 100 of this embodiment has an active region AR and a periphery region PR, wherein the active region AR is configured to display images and sense touches, and the periphery region PR is situated at one or more side(s) of the active region AR and configured to dispose an electronic component such as a driving circuit DC or an integrated circuit IC thereon. In this embodiment, the periphery region PR surrounds the active region AR, but not limited thereto. Note that, in the active region AR, FIG. 1 only shows touch electrodes 172 configured for touch sensing and omits other components to make FIG. 1 simple and clear.

Figure 2:
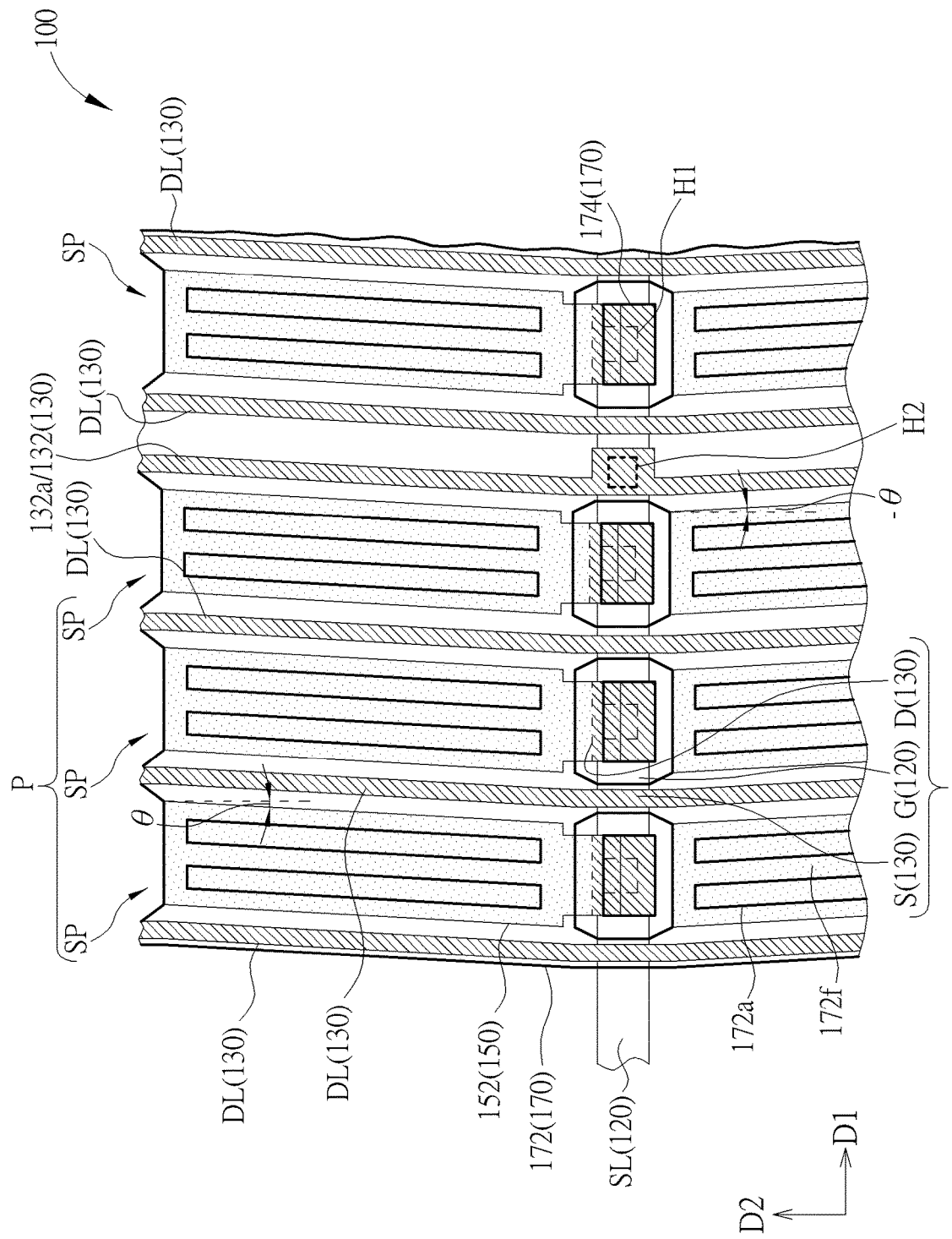
FIG. 2 is a top-view schematic diagram illustrating a portion of an active region of a touch display device according to a first embodiment of the present invention.
Figure 3:
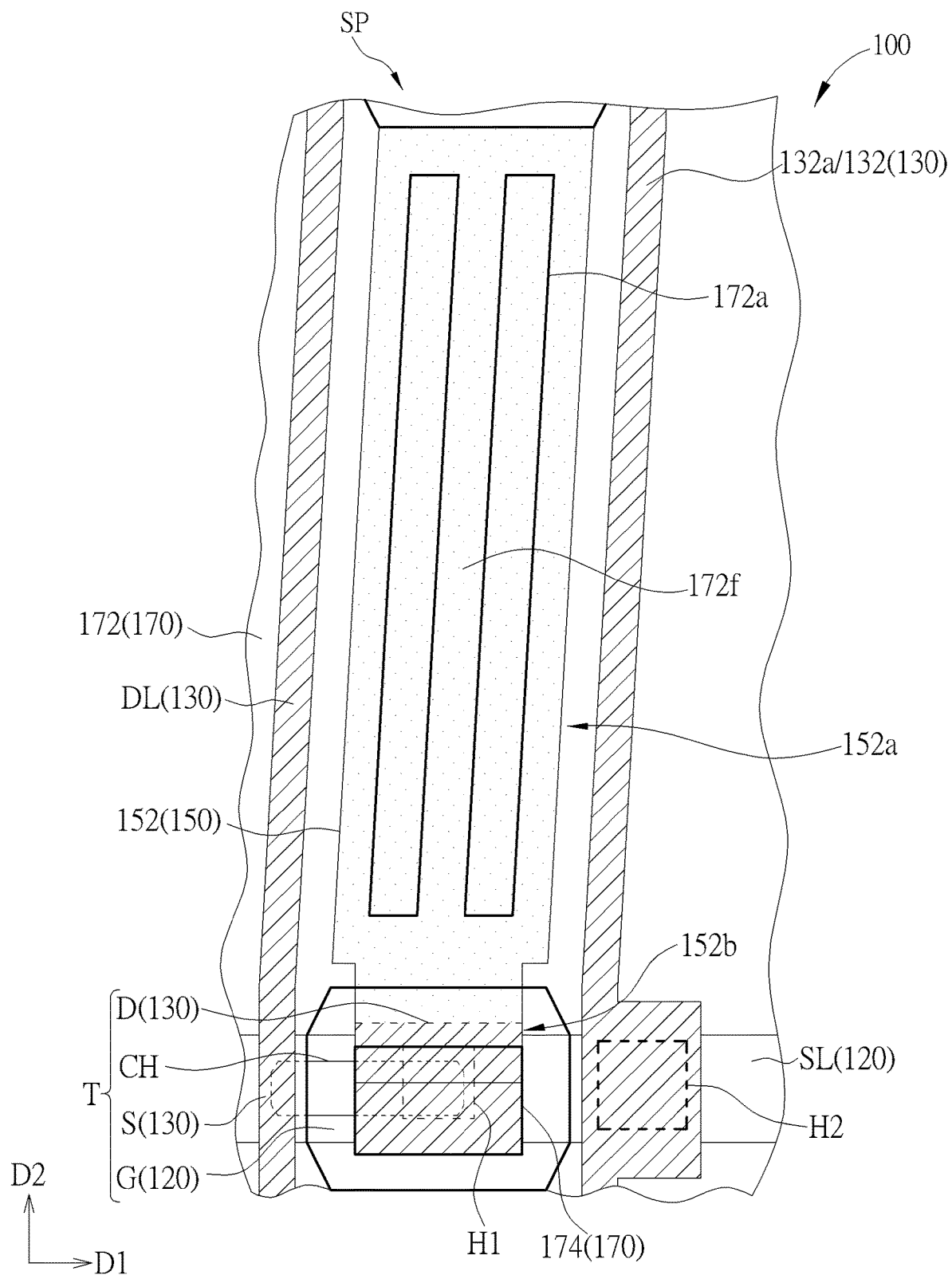
FIG. 3 is a partial enlarged schematic diagram of FIG. 2.
Figure 4:
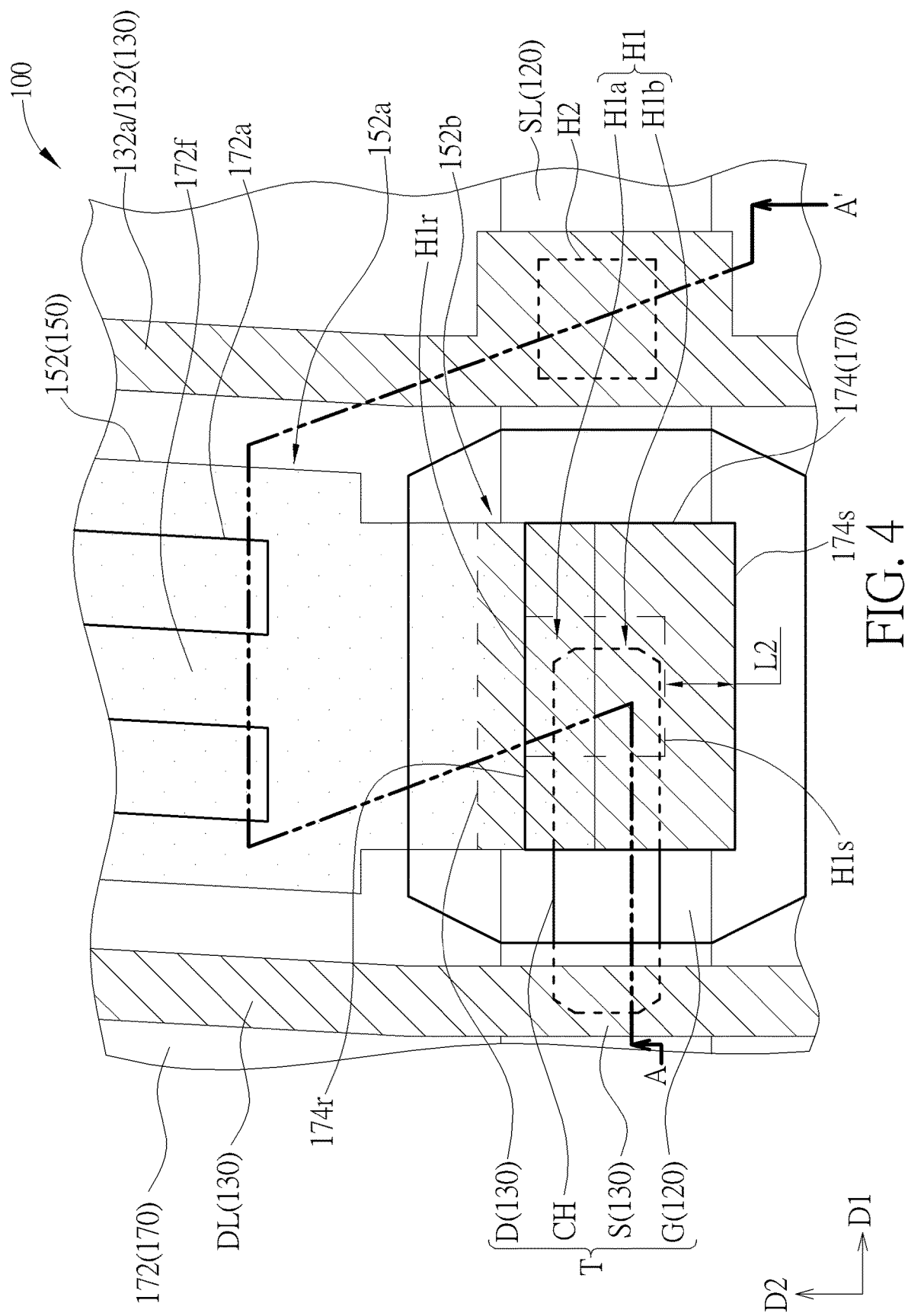
FIG. 4 is a partial enlarged schematic diagram of FIG. 3.
Figure 5:
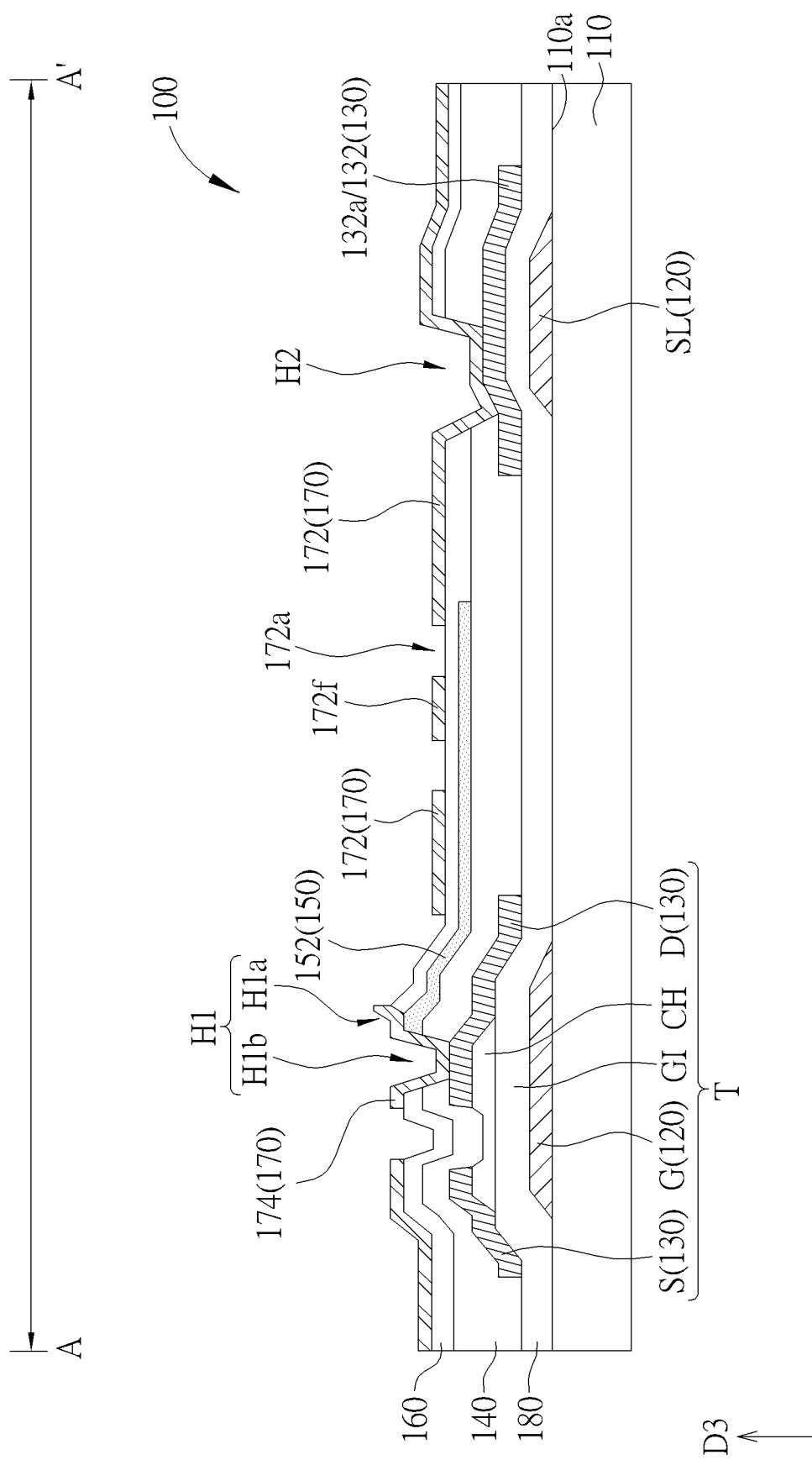
FIG. 5 is a cross-sectional view schematic diagram taken along a cross-sectional line AA' in FIG. 4.

Referring to FIG. 2 to FIG. 5, FIG. 2 is a top-view schematic diagram illustrating a portion of an active region of a touch display device according to a first embodiment of the present invention, FIG. 3 is a partial enlarged schematic diagram of FIG. 2, FIG. 4 is a partial enlarged schematic diagram of FIG. 3, and FIG. 5 is a cross-sectional view schematic diagram taken along a cross-sectional line AA' in FIG. 4, wherein FIG. 2 shows a plurality of sub-pixels SP of the active region AR. As shown in FIG. 2 and FIG. 5, the touch display device 100 of this embodiment includes a substrate 110, a plurality of thin film transistors T, a plurality of signal lines 132, a first insulating layer 140, a first transparent conductive layer 150, a second insulating layer 160, a plurality of first connecting holes H1, a plurality of second connecting holes H2 and a second transparent conductive layer 170. The substrate 110 is utilized for carrying components of the touch display device 100, and the substrate 110 has a surface 110a, wherein the substrate 110 may be a rigid substrate such as a glass substrate, a plastic substrate, a quartz substrate or a sapphire substrate, or a flexible substrate including polyimide (PI) or polyethylene terephthalate (PET) for example, but the invention is not limited thereto.

In FIG. 2, the sub-pixels SP included in the touch display device 100 are arranged in an array. That is, the sub-pixels SP may be arranged in a plurality of rows extending along a first direction D1 and arranged in a plurality of columns extending along a second direction D2, wherein the first direction D1 is not parallel to the second direction D2. The first direction D1 of this embodiment is perpendicular to the second direction D2 in FIG. 2, but the invention is not limited thereto. In this embodiment, a top-view shape of the sub-pixel SP is a shape similar to a parallelogram. In detail, the shape of the sub-pixel SP may have two sides parallel to the first direction D1 and the other two sides not parallel to the first direction D1 and the second direction D2. For example, in the two adjacent rows, each of the other two sides of the sub-pixels SP in one of the rows has a positive included angle θ with respect to the second direction D2 (for example, +7°, but not limited thereto), and each of the other two sides of the sub-pixels SP in another row have a negative included angle −θ with respect to the second direction D2 (for example, −7°, but not limited thereto). The parallelograms of the sub-pixels SP in two adjacent rows are not the same, but they are symmetrical to an imaginary line parallel to the first direction D1. Therefore, two adjacent sub-pixels SP in the second direction D2 are arranged as "<" shape or ">" shape, and the sub-pixels SP in the second direction D2 form serpentine columns, but the invention is not limited thereto. In another embodiment, the shape of the sub-pixel SP may be rectangular, "<" shape, ">" shape or other suitable shapes, and the sub-pixels SP may be arranged depending on requirements; for example, the adjacent rows or the adjacent columns may be misaligned, but the invention is not limited thereto. In addition, in this embodiment, scan lines SL and data lines DL may intersect to define regions of the sub-pixels SP. The scan lines SL are electrically insulated from the data lines DL and cross the data lines DL, and the scan lines SL are electrically insulated from the signal lines 132 and cross the signal lines 132. For example, in FIG. 2, the scan lines SL may extend along the first direction D1 and be arranged parallel to the second direction D2, the data lines DL and the signal lines 132 may approximately extend along the second direction D2 and be arranged parallel to the first direction D1, but the disposition of the scan lines SL, the data lines DL and the signal lines 132 is not limited thereto. The disposition of the scan lines SL, the data lines DL and the signal lines 132 may be designed based on the shape and arrangement of the sub-pixels SP. Furthermore, one pixel P is formed of a plurality of the sub-pixels SP, e.g. one pixel P is formed of three or more sub-pixels SP, so as to serve as a display unit. In FIG. 2, one pixel P is formed of three sub-pixels SP in the same row, but not limited thereto.

The thin film transistors T are disposed on the surface 110a of the substrate 110, and each of the thin film transistors T is correspondingly disposed within one of the sub-pixels SP. Each of the thin film transistors T includes a gate G, a source S, a drain D, a gate insulating layer GI and a semiconductor layer CH. In detail, in this embodiment, a first conductive layer 120, the semiconductor layer CH and a second conductive layer 130 are disposed on the substrate 110 in sequence, wherein the first conductive layer 120 includes the gates G of the thin film transistors T, and the second conductive layer 130 includes the sources S and the drains D of the thin film transistors T, such that the thin film transistors T of this embodiment may be bottom-gate thin film transistors, but not limited thereto. The thin film transistors T of another embodiment may be top-gate thin film transistors. In addition, the touch display device 100 of this embodiment may further include a third insulating layer 180, wherein the third insulating layer 180 includes the gate insulating layer GI and is disposed between the first conductive layer 120 and semiconductor layer CH for separating the gate G from the semiconductor layer CH. The third insulating layer 180 is situated between the first conductive layer 120 and the second conductive layer 130, such that the first conductive layer 120 is separated from the second conductive layer 130. Moreover, in this embodiment, the scan lines SL may be formed of the first conductive layer 120 and electrically connected to at least one of the gates G, so as to transmit controlling signals to switch the corresponding thin film transistor T; the data lines DL may be formed of the second conductive layer 130 and electrically connected to at least one of the sources S, so as to transmit controlling signals of display gray levels, but not limited thereto. Moreover, the first conductive layer 120 and the second conductive layer 130 may include the conductive material with good conductivity, for example a metal material such as aluminum, copper, titanium, tungsten or molybdenum, etc. The first conductive layer 120 and the second conductive layer 130 may be a single-layer structure or a multi-layer structure. The third insulating layer 180 may be silicon oxide, silicon nitride or silicon oxynitride.

The signal lines 132 are disposed on the surface 110a of the substrate 110, wherein the signal lines 132 may include a plurality of touch signal lines 132a configured to transmit touch sensing signals. Moreover, the signal lines 132 may optionally include a plurality of dummy signal lines 132b (shown in FIG. 15). The dummy signal lines 132b and the touch signal lines 132a may be formed of the same layer (such as the second conductive layer 130), and the dummy signal lines 132b may be floating or have a voltage applied such as a grounding voltage or a common voltage. Each of the touch electrodes 172 is correspondingly electrically connected to at least one of the touch signal lines 132a, and the dummy signal lines 132b do not be electrically connected to the touch electrodes 172. In this embodiment, the signal lines 132 may be formed of the second conductive layer 130. The touch signal lines 132a, the dummy signal lines 132b and the data lines DL extending substantially or completely along the second direction D2 may be formed of the same layer, and the touch signal lines 132a, the dummy signal lines 132b, the source S and the drain D may be formed of the same layer, such as the second conductive layer 130, but not limited thereto.

The first insulating layer 140 is disposed on the thin film transistor T and the signal lines 132, and the first transparent conductive layer 150 is disposed on the first insulating layer 140, such that the first insulating layer 140 may separate the first transparent conductive layer 150 from the second conductive layer 130. Since the third insulating layer 180 is disposed between the first conductive layer 120 and the semiconductor layer CH, the third insulating layer 180 is disposed between the substrate 110 and the first insulating layer 140. The first transparent conductive layer 150 may include a plurality of pixel electrodes 152, and each pixel electrode 152 is disposed within a corresponding one of the sub-pixels and electrically connected to the drain D of one corresponding thin film transistor T. Thus, when the thin film transistor T is turned on, the controlling signal of the display gray level transmitted from the data lines DL may be transmitted to the pixel electrode 152. The second insulating layer 160 is disposed on the first insulating layer 140 and the first transparent conductive layer 150, and the second transparent conductive layer 170 is disposed on the second insulating layer 160. Thus, the second insulating layer 160 may be configured to separate the second transparent conductive layer 170 from the first transparent conductive layer 150. The second transparent conductive layer 170 may include a plurality of touch electrodes 172 overlapping the pixel electrodes 152 in a vertical projection direction which is perpendicular to the surface 110a of the substrate 110. The touch electrodes 172 are situated on the pixel electrodes 152, and each touch electrode 172 is electrically connected to at least one of the touch signal lines 132a. Note that each of the touch electrodes 172 of this embodiment may correspond to a plurality of the sub-pixels SP; i.e. one touch electrode 172 may overlap a plurality of the pixel electrodes 152, but not limited thereto. Herein, a portion of the pixel electrode 152 overlapping the drain D in the vertical projection direction is defined as a connecting portion 152b, a portion of the pixel electrode 152 which does not overlap the drain D in the vertical projection direction is defined as a display portion 152a, and the connecting portion 152b is connected to the display portion 152a. Note that the vertical projection direction is perpendicular to the surface 110a of the substrate 110, as shown by the annotation D3 in the drawings. Furthermore, the first insulating layer 140 and the second insulating layer 160 may be a single-layer structure or a multi-layer structure, and may include silicon oxide, silicon nitride or silicon oxynitride; the first transparent conductive layer 150 and the second transparent conductive layer 170 may include indium tin oxide (ITO) or indium zinc oxide (IZO), but not limited thereto.

In the operation of the touch display device 100, the touch electrodes 172 may be respectively operated with different states in at least two time periods. For example, during a first time period (also referred as a display period), the touch electrodes 172 may be provided with the common voltage through the touch signal lines 132a, such that the touch electrodes 172 serve as common electrodes. Therefore, the touch electrodes 172 and the pixel electrodes 152 may control the rotation of the liquid crystal molecules, such that the controlling signals of the display gray levels transmitted by the data lines DL and received by the pixel electrodes 152 may correspond to the transmittances of the sub-pixels SP respectively corresponding to these pixel electrodes 152, so as to display the images. During a second time period (also referred as a touch sensing period), the touch electrodes 172 perform at least one touch sensing to sense the touch action and the touch location of the user, and the touch sensing signals are transmitted to the integrated circuit IC through the touch signal lines 132a, wherein the display period does not overlap the touch sensing period. The operation of the present invention is not limited thereto. The touch sensing method of this embodiment may be a self-capacitance type touch sensing, a mutual capacitance type touch sensing or other types of touch sensing. In addition, each touch electrode 172 may have a plurality of strip electrodes 172f and at least one slit 172a, and each slit 172 is situated between two adjacent strip electrodes 172f, such that electric field may be generated between the pixel electrodes 152 and the touch electrodes 172 to make the liquid crystal molecules rotate.

In a conventional touch display device, the drain and the source of the thin film transistor, the pixel electrode and the data line may be separated from the touch electrode by a single insulating layer. Under the condition that the sub-pixel size is not increased, when the capacitance of the storage capacitor formed of the pixel electrode and the touch electrode needs to be enhanced, a distance between the pixel electrode and the touch electrode can be decreased by reducing the thickness of this single insulating layer. A distance between the data line and the touch electrode is decreased at the same time, however, which causes the loading (the parasitic capacitance) of the data line to be increased. Furthermore, when this single insulating layer is thinner, the possibility of a short-circuit phenomenon is increased owing to metal penetration through this single insulating layer. In the present invention, since the pixel electrode 152 is separated from the data line DL, the drain D and the source S by the first insulating layer 140, and the second insulating layer 160 is disposed between the pixel electrode 152 and the touch electrode 172, the capacitance of the storage capacitor formed of the pixel electrode 152, the touch electrode 172 and a portion of the second insulating layer 160 located therebetween may be increased by reducing a thickness of the second insulating layer 160, and the parasitic capacitance between the data line DL and the touch electrode 172 (which serves as the common electrode in the display cycle) may be decreased by increasing a thickness of the first insulating layer 140, such that the capacitance of the storage capacitor may be increased without increasing the power consumption and the possibility of the metal penetration. Accordingly, the capacitance of the storage capacitor is increased, and the adverse effects associated with increasing resolution are reduced. For example, in the touch display device 100 with high pixel density (high ppi), since a width of the strip electrode 172f and a width of the slit 172a of the touch electrode 172 may not be shrunk further when an area of the sub-pixel SP is shrunk due to the limits of process technology (such as the exposure step and the development step of the photo process (photolithography)), the number of the strip electrodes 172f and the number of the slits 172a situated within one sub-pixel SP are decreased, such that the overlapping area of the pixel electrode 152 and the touch electrode 172 in the vertical projection direction is decreased. According to the design of the present invention, if the pixel density is increased, although the overlapping area of the pixel electrode 152 and the touch electrode 172 is reduced, the capacitance of the storage capacitor may be maintained or only slightly reduced, and the parasitic capacitance between the data line DL and the touch electrode 172 may not be increased simultaneously by adjusting the thickness and material of the first insulating layer 140 and the thickness and material of the second insulating layer 160. In order to promote the above effect, the thickness of the first insulating layer 140 may be greater than the thickness of the third insulating layer 180, and the thickness of the third insulating layer 180 may be greater than the second insulating layer 160. For example, in this embodiment, the thickness of the first insulating layer 140 may range from 4000 Å to 7000 Å, the thickness of the second insulating layer 160 may range from 1500 Å to 3000 Å, and the thickness of the third insulating layer 180 may range from 3000 Å to 5000 Å, but not limited thereto. Note that, in the conventional touch display device, if the drain and the source of the thin film transistor, the pixel electrode and the data line are separated from the touch electrode by the single insulating layer, in order to prevent the loading (the parasitic capacitance) between the data line and the touch electrode from being enhanced and decrease the possibility of metal penetration, a thickness of this single insulating layer ranges from 4000 Å to 7000 Å. The thickness of this single insulating layer is approximately equal to the thickness of the first insulating layer 140 of the present invention. Therefore, compared with the conventional touch display device, the present invention can reduce the distance between the touch electrode 172 and the pixel electrode 152 under the condition that the load (the parasitic capacitance) between the data line DL and the touch electrode 172 is not increased. Moreover, the present invention does not limit the number of the strip electrodes 172f and the number of the slits 172a within one sub-pixel SP. In a modification, within one sub-pixel SP, the touch electrode 172 may have three slits 172a and four strip electrodes 172f, wherein each slit 172a is situated between two adjacent strip electrodes 172f, but not limited thereto.

In a conventional touch display device, the scan line, the data line and the touch signal line may be formed of different layers respectively; for example, three metal layers respectively form the scan line, the data line and the touch signal line. Compared with the design of the present invention where the data line DL and the touch signal line 132a are formed of the same layer, the conventional touch display device further requires one additional patterned metal layer; in other words, the manufacturing method of the conventional touch display device needs to add at least one deposition process and at least one photo-etching-process (PEP). Thus, the touch display device 100 of the present invention can reduce the number of layers deposited and the number of the photo-etching-processes, thus the manufacturing cost is reduced.

Moreover, in the present invention, in order to make the pixel electrodes 152 be electrically connected to the drains D of the thin film transistors T, the first connecting holes H1 of this embodiment are situated in the first insulating layer 140 and the second insulating layer 160, each of the first connecting holes H1 is correspondingly disposed within one sub-pixel SP, and each of the first connecting holes H1 exposes a portion of one of the pixel electrodes 152 and a portion of one of the drains D (one first connecting hole H1 exposes a portion of the pixel electrode 152 and a portion of the drain D within one sub-pixel SP). In the vertical projection direction, each of the first connecting holes H1 overlaps a portion of one of the pixel electrodes 152 and a portion of one of the drains D. In addition, the second transparent conductive layer 170 further includes a plurality of connecting electrodes 174 electrically insulated from the touch electrodes 172, and each of the connecting electrodes 174 extends into one of the first connecting holes H1 and is directly in contact with the exposed portion of the drain D and the exposed portion of the pixel electrode 152, such that the drain D and the pixel electrode 152 in the same sub-pixel SP are electrically connected to each other. In other words, each of the connecting electrodes 174 is electrically connected to one of the drains D and one of the pixel electrodes 152. Note that, as shown in FIG. 4, a projection area of the connecting electrode 174 projected on the surface 110a of the substrate 110 is greater than a projection area of the first connecting hole H1 projected on the surface 110a of the substrate 110, but not limited thereto.

Referring to FIG. 2 and FIG. 5, in order to make the touch signal lines 132a be electrically connected to the touch electrodes 172, the second connecting holes H2 are situated in the first insulating layer 140 and the second insulating layer 160, and each of the second connecting holes H2 exposes a portion of one of the touch signal lines 132a. Each of the touch electrodes 172 extends into at least one of the second connecting holes H2 (for example, each touch electrode 172 of the present invention extends into one second connecting hole H2), so as to be electrically connected to at least one of the touch signal lines 132a (for example, each touch electrode 172 of the present invention is electrically connected to one touch signal line 132a). In particular, after forming the second insulating layer 160 and before forming the second transparent conductive layer 170, a photo-etching-process is performed for etching the first insulating layer 140 and the second insulating layer 160 to form the first connecting holes H1 and the second connecting holes H2, such that the first insulating layer 140 does not cover a portion of each drain D and a portion of each touch signal line 132a, and the second insulating layer 160 does not cover a portion of each pixel electrode 152, a portion of each drain D and a portion of each touch signal line 132a. The first connecting holes H1 and the second connecting holes H2 may be formed in the same process step. The second transparent conductive layer 170 is then formed, wherein each of the connecting electrodes 174 extends into one of the first connecting holes H1 and is in contact with and electrically connected to the exposed portion of one drain D and the exposed portion of one pixel electrode 152, and each of the touch electrodes 172 extends into one of the second connecting holes H2 and is in contact with and electrically connected to the exposed portion of one touch signal line 132a. Since the first connecting holes H1 and the second connecting holes H2 may be formed in the same process step, the number of photo-etching-processes may be reduced, which decreases the manufacturing cost. Moreover, in this embodiment, both the first connecting hole H1 and the second connecting hole H2 may be rectangular, and the connecting electrode 174 may be rectangular, but not limited thereto. The shapes of the first connecting hole H1, the second connecting hole H2 and the connecting electrode 174 may be designed based on requirements. In other embodiments, the first connecting hole H1 and the second connecting holes H2 may be circular, and the connecting electrodes 174 may be rectangular.

In detail, each of the first connecting holes H1 includes a first portion H1a and a second portion H1b, wherein the first portion H1a exposes a portion of one pixel electrode 152 (that is, the first portion H1a is formed by removing a portion of the second insulating layer 160, such that the second insulating layer 160 does not cover the portion of the pixel electrode 152 within the first portion H1a of the first connecting holes H1), and the second portion H1b exposes a portion of one drain D (that is, the second portion H1b is formed by removing a portion of the first insulating layer 140 and a portion of the second insulating layer 160, such that the first insulating layer 140 and the second insulating layer 160 do not cover the portion of the drain D within the second portion H1b of the first connecting holes H1). As shown in FIG. 4 and FIG. 5, the first portion H1a of the first connecting hole H1 of this embodiment exposes at least a portion of the connecting portion 152b of the pixel electrode 152, but not limited thereto. Moreover, the pixel electrode 152 and the drain D of this embodiment may overlap each other within the first portion H1a in the vertical projection direction, and the first insulating layer 140 within the first portion H1a is situated between the pixel electrode 152 and the drain D, such that the first connecting hole H1 may have a preferred cross-sectional shape, which prevents the connecting electrode 174 filled into the first connecting hole H1 from having a broken part. In addition, the overlap of the pixel electrode 152 and the drain D within the first portion H1a in the vertical projection direction may reduce a size of the first connecting hole H1, which increases the effective display area of the sub-pixel SP, and thus the lightness of the sub-pixel SP is enhanced. The disposition of the films within the first connecting hole H1 is not limited thereto. In this embodiment, in order to make the electrical connection and the contact situation of the connecting electrodes 174 better, an area of the first connecting hole H1 may be greater than or equal to twice an area of the first portion H1a, and preferably two to three times the area of the first portion H1a, but not limited thereto. Moreover, in this embodiment, a maximum length of the first connecting hole H1 may range from about 2 μm to about 7 μm, and a maximum length of the connecting electrode 174 (i.e. the length of the connecting electrode 174 along the first direction D1 in FIG. 4) may range from about 8 μm to about 13 μm, but not limited thereto. The size of the connecting electrode 174 may be adjusted depending on the size of the first connecting holes H1 and the offset error range of the manufacturing process.

Figure 6:
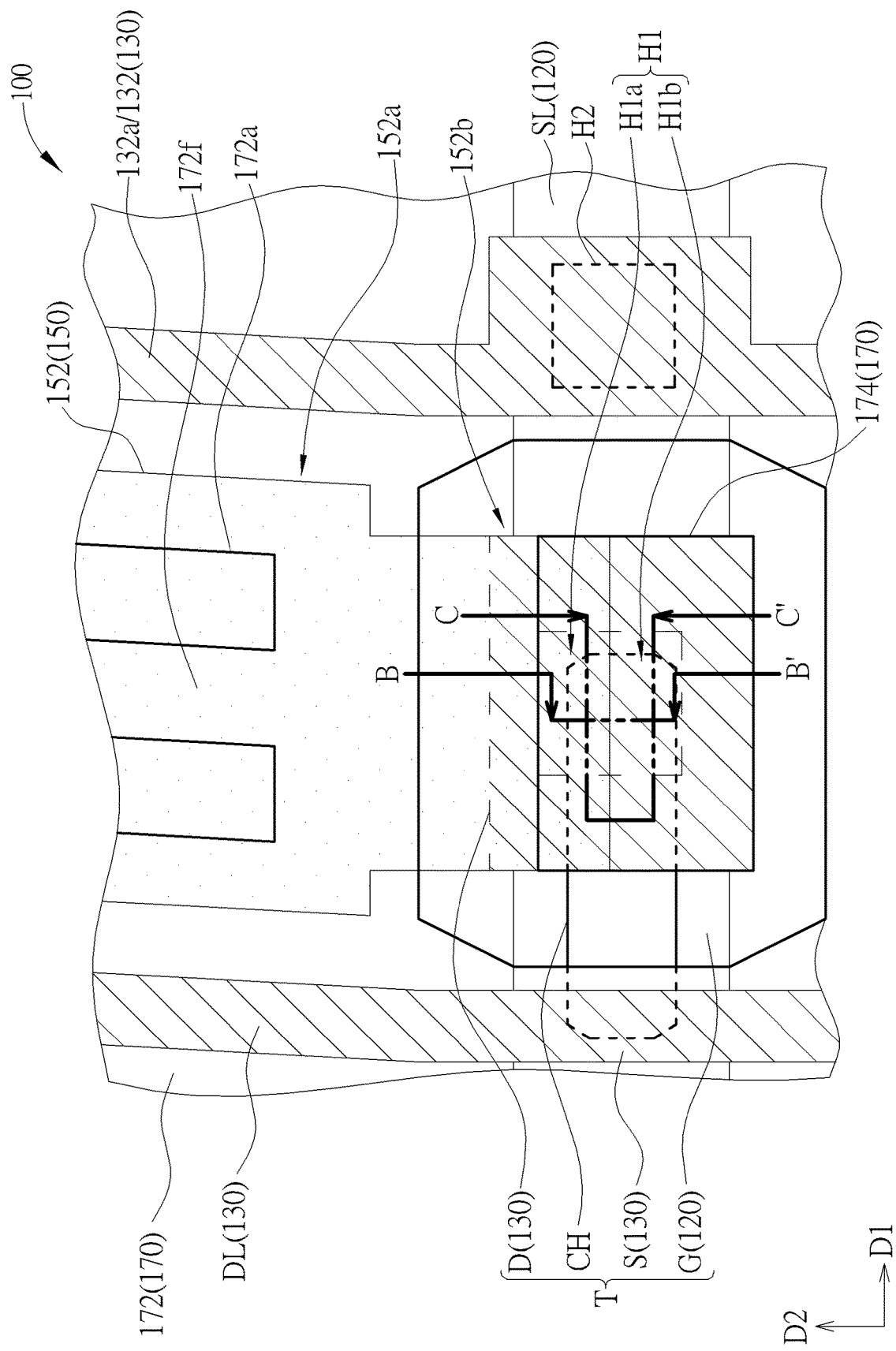
FIG. 6 is a top-view schematic diagram illustrating a portion of the sub-pixel according to the first embodiment of the present invention.
Figure 7:
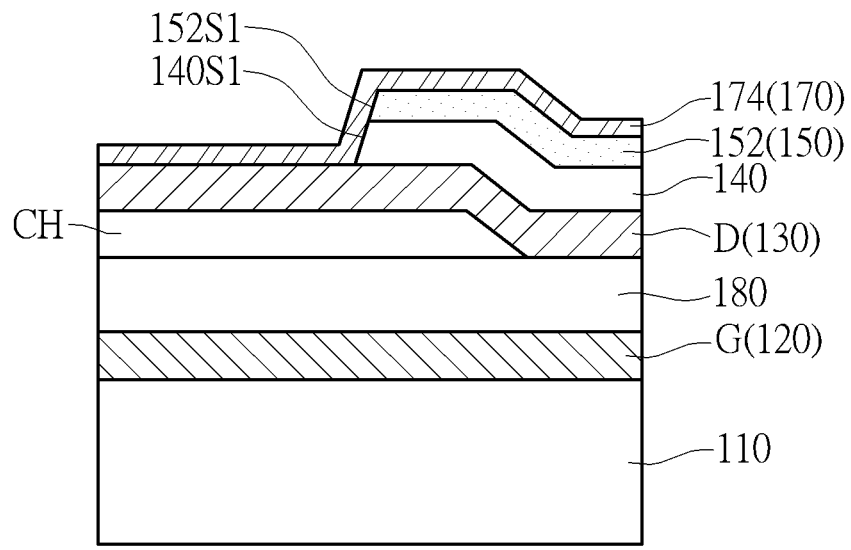
FIG. 7 and FIG. 8 are cross-sectional view schematic diagrams respectively taken along cross-sectional lines BB' and CC' in FIG. 6.
Figure 8:
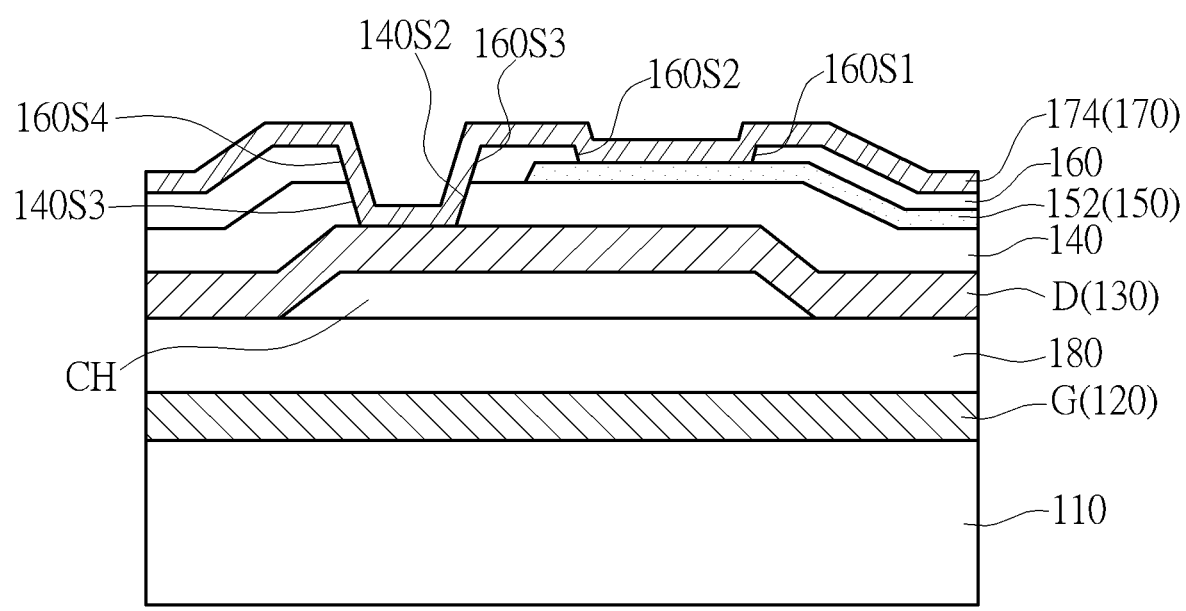
Figure 9:
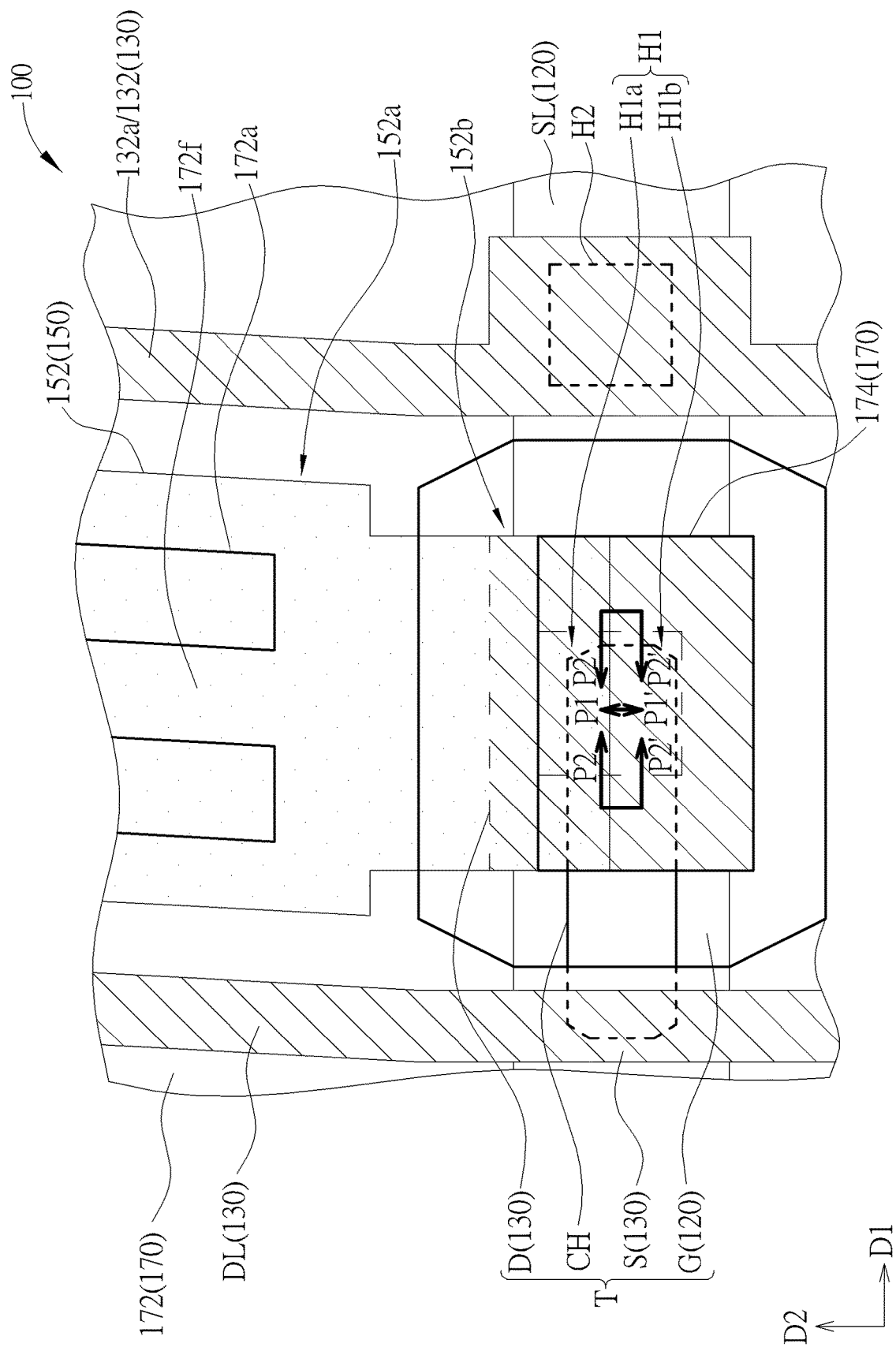
FIG. 9 is a schematic diagram illustrating electrical connection paths between the pixel electrode and the drain according to the first embodiment of the present invention.

Specifically, the first portion H1a of the first connecting hole H1 may be situated at a side of the second portion H1b, the area of the connecting electrode 174 is greater than the area of the first connecting hole H1, the first connecting hole H1 overlaps a portion of the connecting electrode 174 in the vertical projection direction, and another portion of the connecting electrode 174 surrounds the first connecting hole H1 when viewed in the vertical projection direction, but not limited thereto. The dispositions of the first portion H1a and the second portion H1b may be designed based on requirements. In this embodiment, the pixel electrode 152 may be electrically connected to the drain D through the connecting electrode 174 situated in the first connecting hole H1 and/or through the connecting electrode 174 surrounding the first connecting hole H1. In detail, referring to FIG. 6 to FIG. 9, FIG. 6 is a top-view schematic diagram illustrating a portion of the sub-pixel according to the first embodiment of the present invention, FIG. 7 and FIG. 8 are cross-sectional view schematic diagrams respectively taken along cross-sectional lines BB' and CC' in FIG. 6, and FIG. 9 is a schematic diagram illustrating electrical connection paths between the pixel electrode and the drain according to the first embodiment of the present invention. As shown in FIG. 6 and FIG. 7, the connecting electrode 174 is in contact with the pixel electrode 152 in the first connecting hole H1, and extends to the top surface of the drain D along the side edges 152S1, 140S1 of the pixel electrode 152 and the first insulating layer 140, so as to be in contact with the drain D, such that the pixel electrode 152 is electrically connected to the drain D through the connecting electrode 174 situated in the first connecting hole H1. In other words, an electrical connection method of the pixel electrode 152 and the drain D may be that the connecting electrode 174 situated in the first connecting hole H1 is in contact with the pixel electrode 152 and the drain D, which may correspond to the first electrical connection path P1-P1' between the pixel electrode 152 and the drain D as shown in in FIG. 9. As shown in FIG. 6 and FIG. 8, along the cross-sectional line CC', the connecting electrode 174 extends from the outside of the first connecting hole H1 into the first connecting hole H1 along the side edge 160S1 of the second insulating layer 160 to be in contact with the pixel electrode 152, and then extends to the outside of the first connecting hole H1 along the side edge 160S2 of the second insulating layer 160. Next, after the connecting electrode 174 extends by a certain distance outside the first connecting hole H1, the connecting electrode 174 extends from the outside of the first connecting hole H1 into the first connecting hole H1 along the side edges 160S3, 140S2 of the second insulating layer 160 and the first insulating layer 140 to be in contact with the drain D, such that the pixel electrode 152 and the drain D may be electrically connected to each other through the connecting electrode 174. Finally, the connecting electrode 174 extends to the outside of the first connecting hole H1 along the side edges 140S3, 160S4 of the first insulating layer 140 and the second insulating layer 160. In other words, in another electrical connection method of the pixel electrode 152 and the drain D, the connecting electrode 174 is in contact with the pixel electrode 152 in the first connecting hole H1, then extends from the inside of the first connecting hole H1 to the outside of the first connecting hole H1, then extends a certain distance outside the first connecting hole H1, and then extends from the outside of the first connecting hole H1 into the first connecting hole H1 to be in contact with the drain D. This electrical connection method may correspond to a second electrical connection path P2-P2' between the pixel electrode 152 and the drain D as shown in FIG. 9. Therefore, in the above cases, the pixel electrode 152 may be electrically connected to the drain D by the first electrical connection path P1-P1' and/or the second electrical connection path P2-P2'.

Figure 10:
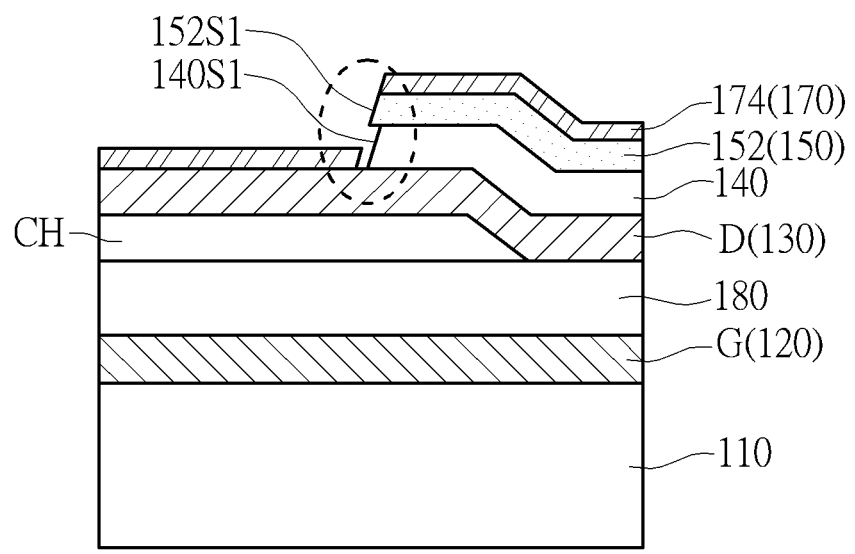
FIG. 10 is another cross-sectional-view schematic diagram taken along the cross-sectional line BB' in FIG. 6.

FIG. 10 is another cross-sectional-view schematic diagram taken along the cross-sectional line BB' in FIG. 6. In another embodiment, when etching the first insulating layer 140 corresponding to the second portion H1b, the photo-etching-process may perform slight etching in the direction of the side edge in addition to etching in the vertical direction. Therefore, the first insulating layer 140 corresponding to the first portion H1a (that is, the first insulating layer 140 disposed below the pixel electrode 152 in the vertical projection direction) may be etched partially; resulting in the side edge 140S1 of the first insulating layer 140 being shrunk inward. An undercut phenomenon occurs in the first insulating layer 140 below the pixel electrode 152, such that the first connecting hole H1 has an undercut structure (represented by the dashed circle in FIG. 10). Accordingly, after forming the connecting electrode 174, the connecting electrode 174 filled into the first connecting hole H1 may have a broken part so the pixel electrode 152 cannot be electrically connected to the drain D by the first electrical connection path P1-P1'. Since the pixel electrode 152 can still be electrically connected to the drain D by the second electrical connection path P2-P2', there is no electrical discontinuity between the pixel electrode 152 and the drain D. Thus, by the specific layout design of the drain D, the pixel electrode 152, the first connecting hole H1 and the connecting electrodes 174 in the present invention, the product yield may be increased significantly.

In addition, as shown in FIG. 4, each of the connecting electrodes 174 may have a first edge 174r and a second edge 174s, wherein the first edge 174r is an edge of the connecting electrode 174 having a shortest distance from the display portion 152a of the pixel electrode 152 in the second direction D2 (an edge of the connecting electrode 174 closest to the display portion 152a), the second edge 174s is an edge of the connecting electrode 174 having a longest distance from the display portion 152a of the pixel electrode 152 in the second direction D2 (an edge of the connecting electrode 174 furthest from the display portion 152a), and the first edge 174r is situated between the second edge 174s and the display portion 152a. Each of the first connecting holes H1 has a third edge H1r and a fourth edge H1s, wherein the third edge H1r is an edge of the first connecting hole H1 having a shortest distance from the display portion 152a of the pixel electrode 152 in the second direction D2 (an edge of the first connecting hole H1 closest to the display portion 152a), the fourth edge H1s is an edge of the first connecting hole H1 having a longest distance from the display portion 152a of the pixel electrode 152 in the second direction D2 (an edge of the first connecting hole H1 furthest from the display portion 152a), and the third edge H1r is situated between the fourth edge H1s and the display portion 152a. In this embodiment, since the shapes of the connecting electrode 174 and the first connecting hole H1 are rectangular, the first edge 174r and the second edge 174s are two opposite edges of the connecting electrode 174 in the second direction D2, and the third edge H1r and the fourth edge H1s are two opposite edges of the first connecting hole H1 in the second direction D2, but not limited thereto. For example, if the shape of the first connecting hole H1 is circular, the third edge H1r and the fourth edge H1s are two opposite arcs of the first connecting hole H1 in the second direction D2.

The aperture ratio of the sub-pixel SP may be changed according to the overlapping area of the touch electrode 172 and the pixel electrode 152. Because the connecting electrode 174 is electrically insulated from the touch electrode 172, considering the limits of process technology (such as the photolithograph process and etching process), a minimum space lies between the touch electrode 172 and the connecting electrode 174 to avoid electrical shorting. Thereby, the size or position of the connecting electrode 174 may influence the size and position of the touch electrode 172, so as to affect the aperture ratio of the sub-pixel SP. Therefore, in order to enhance the aperture ratio of the sub-pixel SP, this embodiment reduces the distance between the first edge 174$r$ of the connecting electrode 174 and the third edge H1$r$ of the first connecting hole H1 (as shown in FIG. 4), such that the overlapping area of the touch electrode 172 and the pixel electrode 152 is increased, and thereby the capacitance of the storage capacitor and the aperture ratio of the sub-pixel SP are increased. In this embodiment, the first edge 174$r$ of the connecting electrode 174 overlaps and is aligned with the third edge H1$r$ of the first connecting hole H1 (that is, a portion of the contour of the first connecting hole H1 overlaps a portion of the contour of the connecting electrode 174 in the vertical projection direction), and the connecting electrode 174 totally covers the corresponding first connecting hole H1, but not limited thereto.

Figure 11:
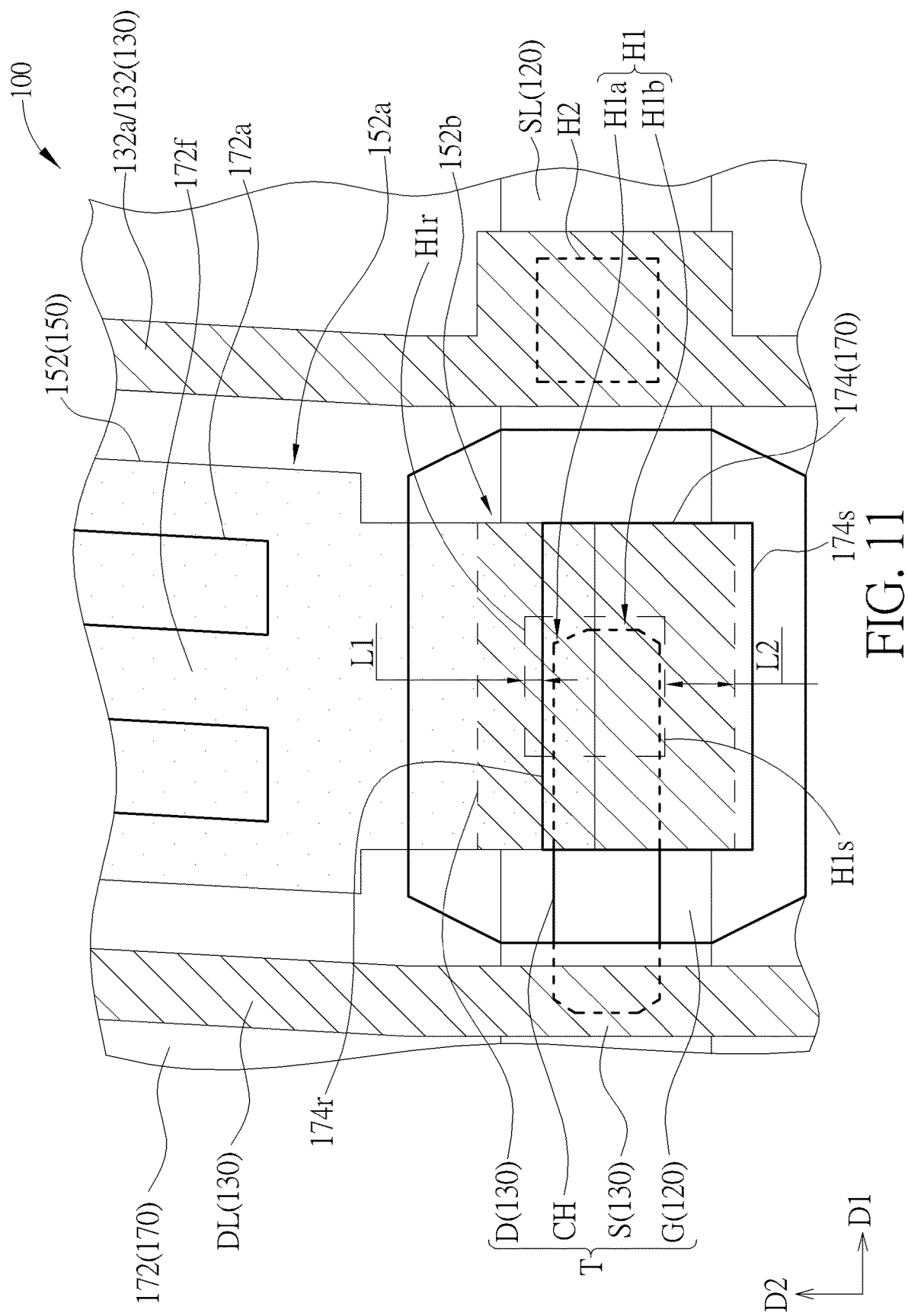
FIG. 11 is a top-view schematic diagram illustrating a portion of the sub-pixel according to a modification of the first embodiment of the present invention.
Figure 12:
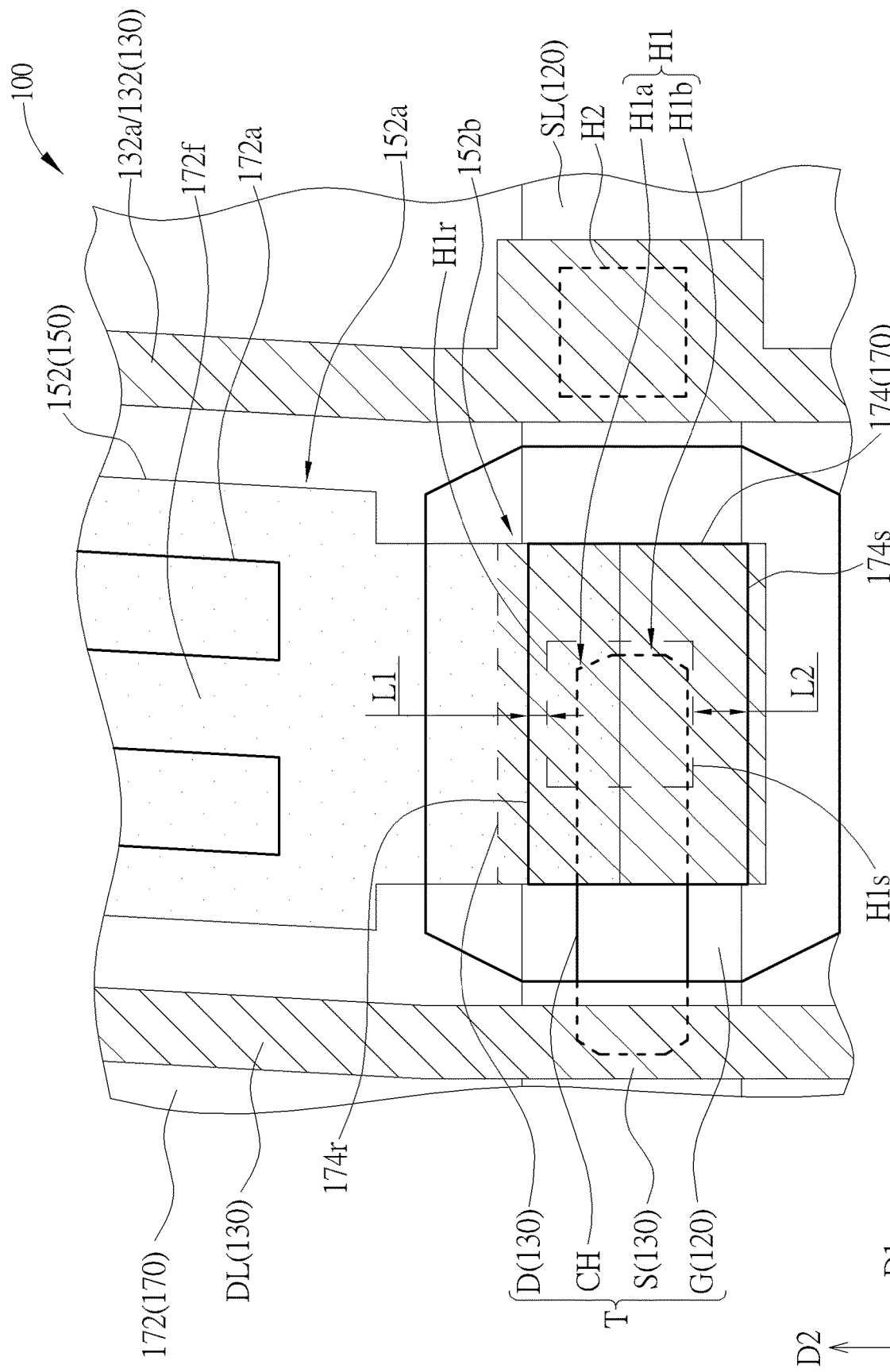
FIG. 12 is a top-view schematic diagram illustrating a portion of the sub-pixel according to another modification of the first embodiment of the present invention.

FIG. 11 is a top-view schematic diagram illustrating a portion of the sub-pixel according to a modification of the first embodiment of the present invention. As shown in FIG. 11, the connecting electrode 174 does not totally cover the corresponding first connecting hole H1 (that is, the connecting electrode 174 partially overlaps the corresponding first connecting hole H1 in the vertical projection direction), such that a portion of the pixel electrode 152 exposed in the first connecting hole H1 overlaps the connecting electrode 174 in the vertical projection direction (that is, a portion of the pixel electrode 152 exposed in the first connecting hole H1 is in contact with the connecting electrode 174 directly), and another portion of the pixel electrode 152 exposed in the first connecting hole H1 does not overlap the connecting electrode 174 (that is, another portion of the pixel electrode 152 exposed in the first connecting hole H1 is not in contact with the connecting electrode 174 directly). Therefore, the first edge 174$r$ is situated between the third edge H1$r$ and the fourth edge H1$s$, and at least a portion of the vertical projection of the first edge 174$r$ of the connecting electrode 174 is situated within the first connecting hole H1. FIG. 12 is a top-view schematic diagram illustrating a portion of the sub-pixel according to another modification of the first embodiment of the present invention. As shown in FIG. 12, the connecting electrode 174 totally covers the corresponding first connecting hole H1, and the third edge H1$r$ is situated between the first edge 174$r$ and the fourth edge H1$s$. In other words, the vertical projection of the contour of the connecting electrode 174 surrounds and does not intersect with the vertical projection of the contour of the first connecting hole H1. The positions of the connecting electrode 174 and the first connecting hole H1 described above are examples, and the present invention is not limited to these examples.

Regarding FIG. 4, FIG. 11 and FIG. 12, if a layout of a photomask corresponds to the structure shown in FIG. 4, the sub-pixel SP shown in FIG. 4, FIG. 11 and FIG. 12 may be manufactured under the respective conditions that: the connecting electrode 174 does not have an alignment offset with respect to the first connecting hole H1; the connecting electrode 174 has a negative alignment offset with respect to the first connecting hole H1 along the second direction D2; and that the connecting electrode 174 has a positive alignment offset with respect to the first connecting hole H1 along the second direction D2. In another embodiment, the layout of the photomask may correspond to FIG. 11/FIG. 12, such that the sub-pixel SP shown in FIG. 11/FIG. 12 may be manufactured under a condition without an offset, and the sub-pixels SP shown in FIG. 4 or FIG. 12/FIG. 11 may be manufactured under a condition with an offset. The layout of the photomask of the present invention is not limited thereto.

Regarding to FIG. 4, FIG. 11 and FIG. 12, the first edge 174$r$ shown in FIG. 4 is aligned with the third edge H1$r$, a first distance L1 exists between the first edge 174$r$ and the third edge H1$r$ shown in FIG. 11 and FIG. 12, and a second distance L2 exists between the second edge 174$s$ and the fourth edge H1$s$ shown in FIG. 4, FIG. 11 and FIG. 12, wherein the first distance L1 is a distance between the first edge 174$r$ and a point of the third edge H1$r$ closest to the display portion 152$a$ of the pixel electrode 152 in a perpendicular direction of the first edge 174$r$, and the second distance L2 is a distance between the second edge 174$s$ and a point of the fourth edge H1$s$ furthest from the display portion 152$a$ of the pixel electrode 152 in a perpendicular direction of the second edge 174$s$. In this embodiment, the first distance L1 and the second distance L2 are parallel to the second direction D2, but not limited thereto. In the embodiment where the sub-pixel SP is manufactured according to the layout of the photomask corresponding to the structure shown in FIG. 4, because the second distance L2 along the second direction D2 exists between the second edge 174$s$ of the connecting electrode 174 and the fourth edge H1$s$ of the first connecting hole H1, and the second distance L2 is greater than the alignment offset of the connecting electrode 174 with respect to the first connecting hole H1 along the second direction D2 in the manufacturing process, when the positive alignment offset of the connecting electrode 174 with respect to the first connecting hole H1 along the second direction D2 occurs (i.e. the embodiment shown in FIG. 12), the connecting electrode 174 still totally covers the portion of the drain D exposed by the first connecting holes H1, so as to prevent the metal (the drain D) from being directly exposed and corroded. Similarly, in the embodiment where the sub-pixel SP is manufactured according to the layout of the photomask corresponding to the structure shown in FIG. 11 or FIG. 12, the second distance L2 is greater than the alignment offset of the connecting electrode 174 with respect to the first connecting hole H1 along the second direction D2 in the manufacturing process, so as to prevent the metal (the drain D) from being directly exposed and corroded. Moreover, in the embodiments shown in FIG. 4, FIG. 11 and FIG. 12, the shapes of the first connecting hole H1 and the second connecting hole H2 are rectangular, but not limited thereto. In a modification, the shape of the first connecting hole H1 and/or the shape of the second connecting hole H2 may be circular or other shapes. For example, although the shapes of the first connecting hole H1 and the second connecting hole H2 are rectangular in the layout of the photomask, after performing the photolithograph process and the etching process, the first connecting hole H1 and the second connecting hole H2 may be formed with circular shapes.

Figure 13:
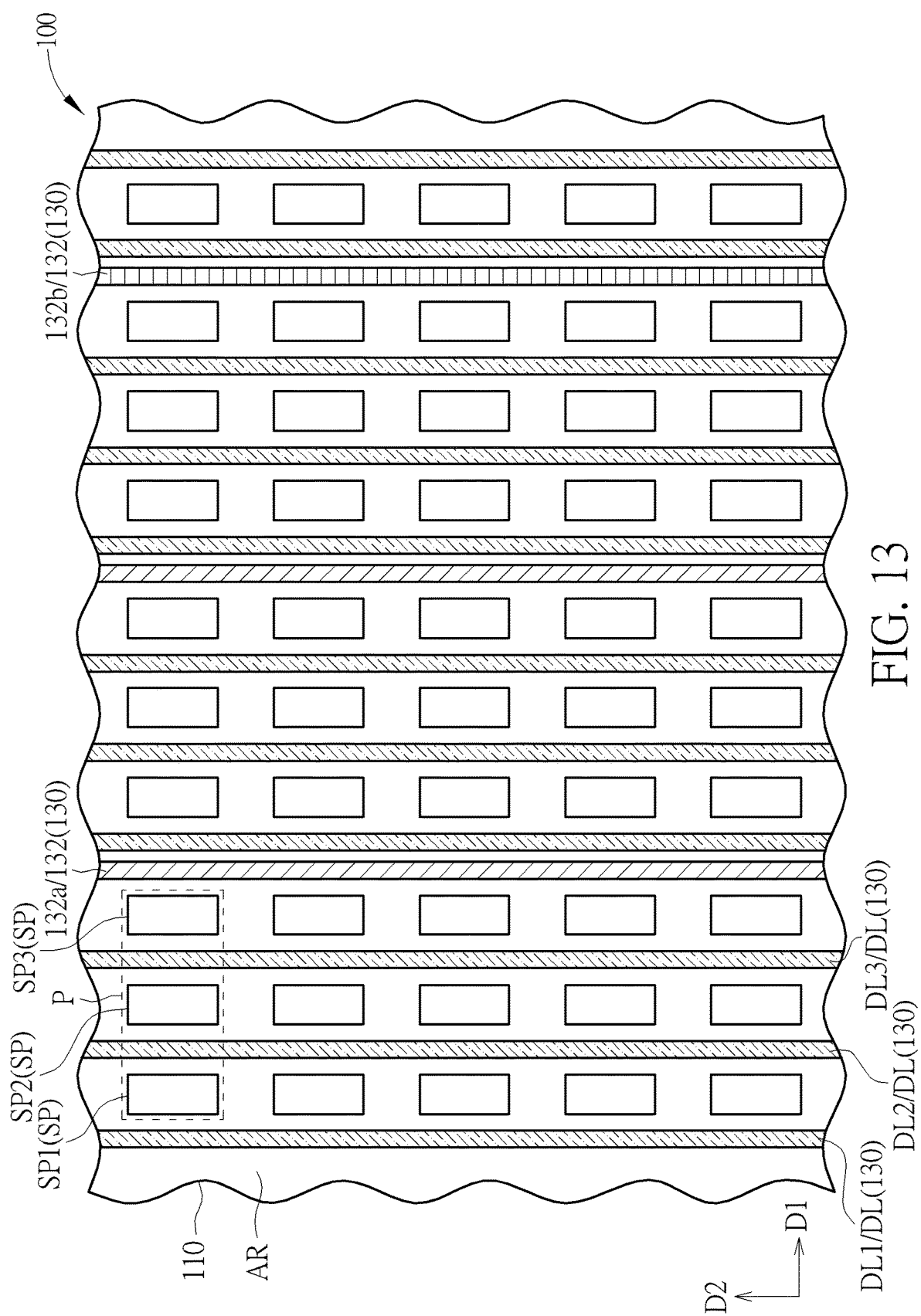
FIG. 13 and FIG. 14 are top-view schematic diagrams illustrating the sub-pixels, the data lines and the signal lines respectively according to an embodiment and another embodiment of the present invention.
Figure 14:
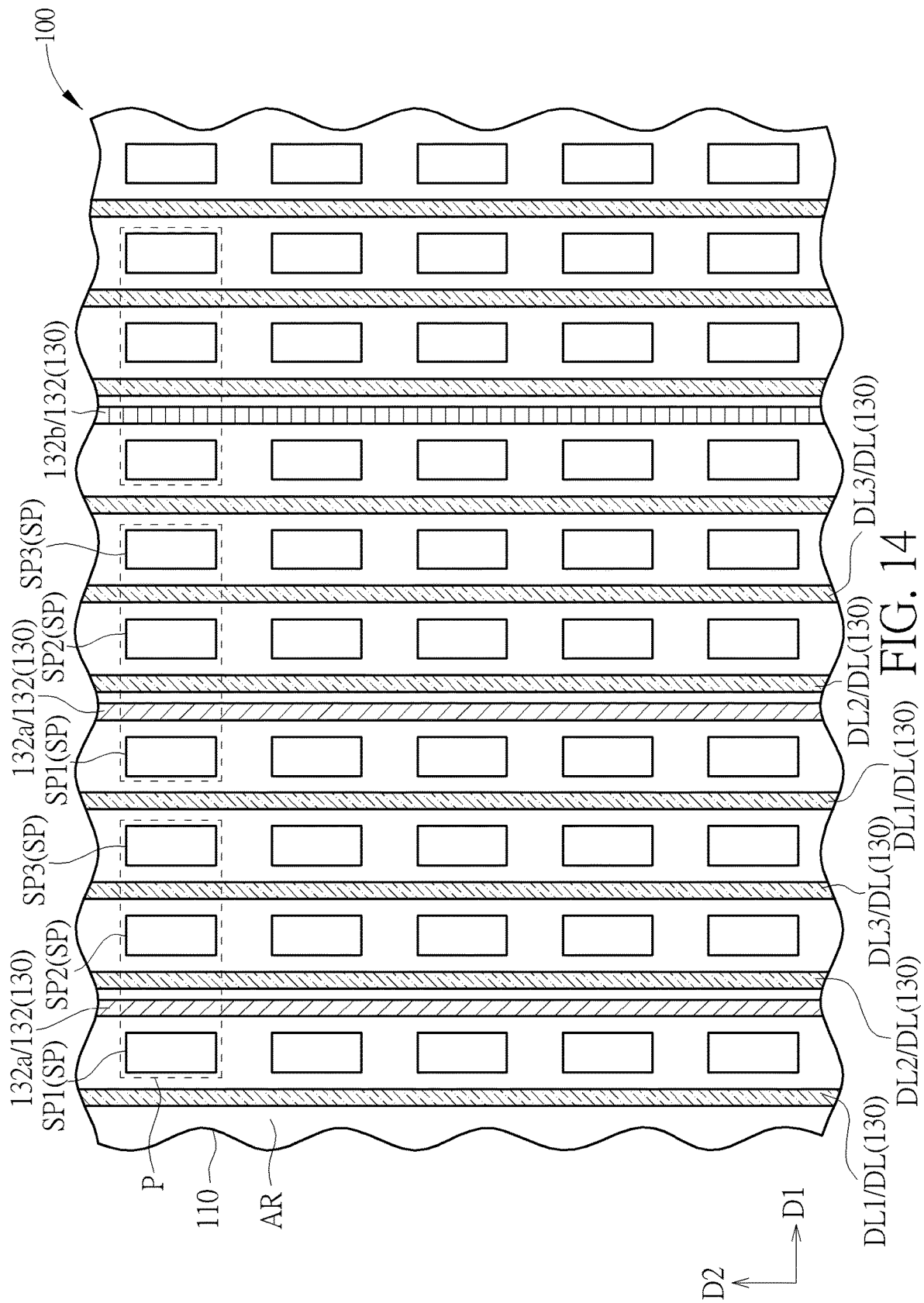

Referring to FIG. 13 and FIG. 14, and further referring to FIG. 2, FIG. 13 and FIG. 14 are top-view schematic diagrams illustrating sub-pixels, data lines and signal lines respectively according to an embodiment and another embodiment of the present invention, wherein FIG. 13 and FIG. 14 omit the structures within the sub-pixels SP, simplify the data lines DL and the signal lines 132 into the traces extending along the second direction D2, and simplify the sub-pixel SP into a rectangular shape. In FIG. 13 and FIG. 14, although the shadings of the data line DL, the touch signal line 132$a$ and the dummy signal line 132$b$ are different, the data line DL, the touch signal line 132$a$ and the dummy signal line 132b are formed of the same layer. As shown in FIG. 2 and FIG. 13, each of the pixels P may correspond to one of the signal lines 132. For instance, each of the pixels P in this embodiment is composed of three sub-pixels SP which display different colors respectively (i.e. R, G, B); thus, two adjacent signal lines 132 may be separated by three sub-pixels SP in the first direction D1; in other words, three data lines DL may be disposed between two adjacent signal lines 132, and the spaces between any two adjacent signal lines 132 may be the same, but not limited thereto. The dispositions of the data lines DL and the signal lines 132 can be designed according to the number of sub-pixels SP included in one pixel P. In the above case, since the spaces between two adjacent signal lines 132 are the same, and each of the pixels P corresponds to one signal line 132, the lightness of the display images may be balanced. Moreover, in this embodiment, two adjacent signal lines 132 may be separated by one whole pixel P in the first direction D1, i.e. each of the signal lines 132 is situated outside of the pixels P, but not limited thereto. For example, each of the pixels P is composed of three sub-pixels SP1, SP2, SP3 disposed along the first direction D1, three data lines DL1, DL2, DL3 are respectively disposed and correspond to three sub-pixels SP1, SP2, SP3, and the pixels P are sequentially arranged in the first direction D1 and arranged from the first column to the $K^{th}$ column of the touch display device 100 with K columns. Regarding the pixels P from the first column to the $K^{th}$ column, one signal line 132 exists between any two adjacent columns of the pixels P when viewed in the vertical projection direction, so the signal line 132 between the $i^{th}$ column of the pixels P and the $(i+1)^{th}$ column of the pixels P is disposed between the data line DL3 of the $i^{th}$ column of the pixels P and the data line DL1 of the $(i+1)^{th}$ column of the pixels P, wherein i is a positive integer greater than or equal to 1 and less than K. Furthermore, one of the signal lines 132 may exist outside the $K^{th}$ column of the pixels P (i.e. at the right side), or may exist outside the first column of the pixels P (i.e. at the left side). As shown in FIG. 2 and FIG. 14, in another embodiment, each of the signal lines 132 may cross over a corresponding one column of the pixels P, and two adjacent signal lines 132 may be separated by three sub-pixels SP in the first direction D1 when viewed in the vertical projection direction, wherein two of these three sub-pixels SP are included in one pixel P, and the other is included in another pixel P. For instance, each of the pixels P is composed of three sub-pixels SP1, SP2, SP3 disposed along the first direction D1, three data lines DL1, DL2, DL3 are respectively disposed and correspond to three sub-pixels SP1, SP2, SP3, and the pixels P are sequentially arranged in the first direction D1 and arranged from the first column to the $K^{th}$ column of the touch display device 100 with K columns. Each of the signal lines 132 is disposed in an area of one corresponding column of the pixels P when viewed in the vertical projection direction, i.e. each of the signal lines 132 is disposed between two of three columns of the sub-pixels SP of one corresponding column of the pixels P, and three columns of the sub-pixels SP are disposed between two adjacent signal lines 132. In other words, two adjacent signal lines 132 are respectively disposed in the $i^{th}$ column of the pixels P and the $(j+1)^{th}$ column of the pixels P; in detail, two adjacent signal lines 132 are respectively disposed between the data lines DL1, DL2 of the $i^{th}$ column of the pixels P and the data lines DL1, DL2 of the $(j+1)^{th}$ column of the pixels P, or are respectively disposed between the data lines DL2, DL3 of the $i^{th}$ column of the pixels P and the data lines DL2, DL3 of the $(j+1)^{th}$ column of the pixels P, wherein j is a positive integer greater than or equal to 1 and less than K, such that three data lines DL1, DL2, DL3 are situated between two adjacent signal lines 132.

In this embodiment, because each of the pixels P is composed of three sub-pixels SP, a ratio of the number of the data lines DL to the number of the signal lines 132 may be 3:1. For instance, if the touch display device 100 has 720×1280 pixels P (a length-breadth ratio of the active region AR of the touch display device 100 is 16:9) and 576 touch electrodes 172, and the integrated circuit IC used in the touch display device 100 may be electrically connected to the 576 touch electrodes 172, the touch display device 100 has 2160 data lines DL (720×3) and 720 signal lines 132, wherein the 720 signal lines 132 include the 576 touch signal lines 132a and the 144 dummy signal lines 132b, and the integrated circuit IC is electrically connected to the 576 touch electrodes 172 by 576 touch signal lines 132a, respectively, so as to perform touch sensing. Note that one of the purposes of disposing the dummy signal lines 132b is increasing the number of signal lines 132, such that each of the pixels P corresponds to one of the signal lines 132, which achieves the balance effect of the lightness of the display images. The numbers of the data lines DL, the touch signal lines 132a and the dummy signal lines 132b are not limited by the above, and may be designed according to the number of pixels P, the used integrated circuit IC and the number of sub-pixels SP included in one pixel P.

In addition, as shown in FIG. 1, FIG. 13 and FIG. 14, the touch display device 100 may further include a plurality of first traces 192 and a plurality of second traces 194 disposed on the substrate 110 and situated in the periphery region PR, where the first traces 192 are electrically insulated from the second traces 194, the first trace 192 is electrically connected between one of the touch signal lines 132a and one of the touch sensing pads of the integrated circuit IC, and the second trace 194 is electrically connected between one of the data lines DL and one of the source pads of the integrated circuit IC. Therefore, the integrated circuit IC may be electrically connected to the touch electrodes 172 through the first traces 192 and the touch signal lines 132a in sequence, and electrically connected to the sources S of the thin film transistors T through the second traces 194 and the data lines DL in sequence. Moreover, in the embodiments where the signal lines 132 further include the dummy signal lines 132b, some of the first traces 192 are electrically connected to the touch signal lines 132a, while the others are electrically connected to the dummy signal lines 132b, but not limited thereto. In FIG. 1, the first traces 192 and the second traces 194 may intersect when viewed in the vertical projection direction, wherein the first traces 192 are electrically connected to the touch sensing pads which may be situated at a left part and a right part of the integrated circuit IC, and the second traces 194 are electrically connected to the source pads which may be situated at the center of the integrated circuit IC, but not limited thereto. In another embodiment, the first traces 192 and the second traces 194 may intersect when viewed in the vertical projection direction, wherein the first traces 192 are electrically connected to the touch sensing pads which may be situated at the center of the integrated circuit IC, and the second traces 194 are electrically connected to the source pads which may be situated at a left part and a right part of the integrated circuit IC. In still another embodiment, the first traces 192 and the second traces 194 may not intersect when viewed in the vertical projection direction, and may be alternately electrically connected to the touch sensing pads and the source pads of the integrated circuit IC respectively; for example, three of the second traces 194 are situated between two adjacent first traces 192. In addition, the dummy signal lines 132b may be electrically connected to dummy pads or at least one voltage pad of the integrated circuit IC through other traces in the periphery region PR, wherein the dummy pads are floating, and the voltage pad may provide a predetermined voltage (i.e. the grounding voltage or the common voltage) to the dummy signal lines 132b, such that the dummy signal lines 132b are floating or have the predetermined voltage applied. For instance, each of the first traces 192 may be electrically connected to one of the dummy signal lines 132b or one of the touch signal lines 132a, such that the dummy signal lines 132b and the touch signal lines 132a may be electrically connected to the dummy pads (or the voltage pads) and the touch sensing pads of the integrated circuit IC respectively, but not limited thereto. In another embodiment, the dummy signal lines 132b may be electrically connected to other electronic components or voltage lines through other traces in the periphery region PR. For example, the dummy signal lines 132b may be electrically connected to a common voltage line (i.e. a common voltage (Vcom) ring) disposed on the substrate 100, such that the voltage applied on the dummy signal lines 132b is the common voltage.

Figure 15A:
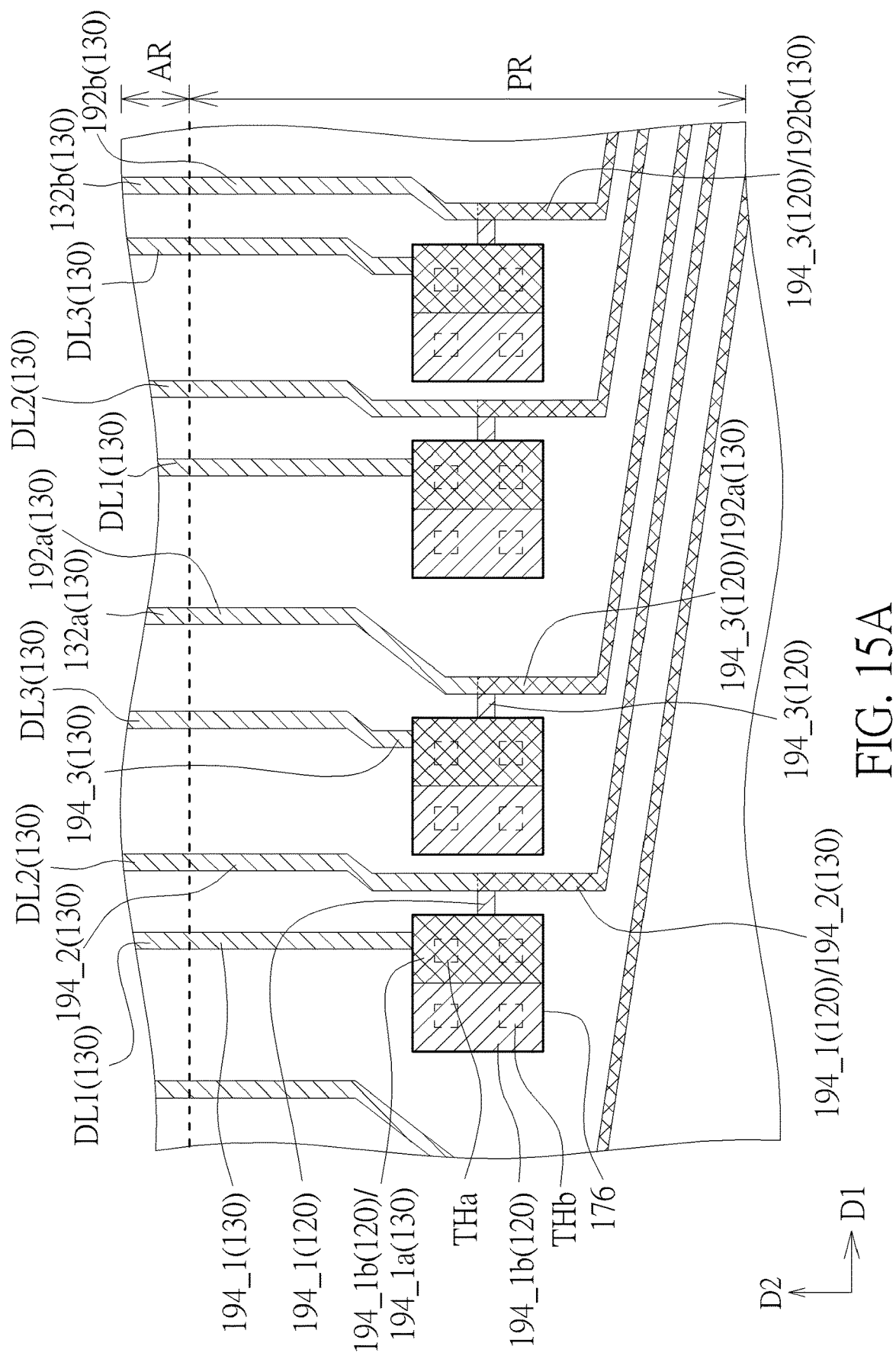
FIG. 15A and FIG. 15B are top-view schematic diagrams illustrating data lines, signal lines, first traces, second traces, touch sensing connecting pads, dummy connecting pads and source connecting pads according to another embodiment of the present invention.
Figure 15B:
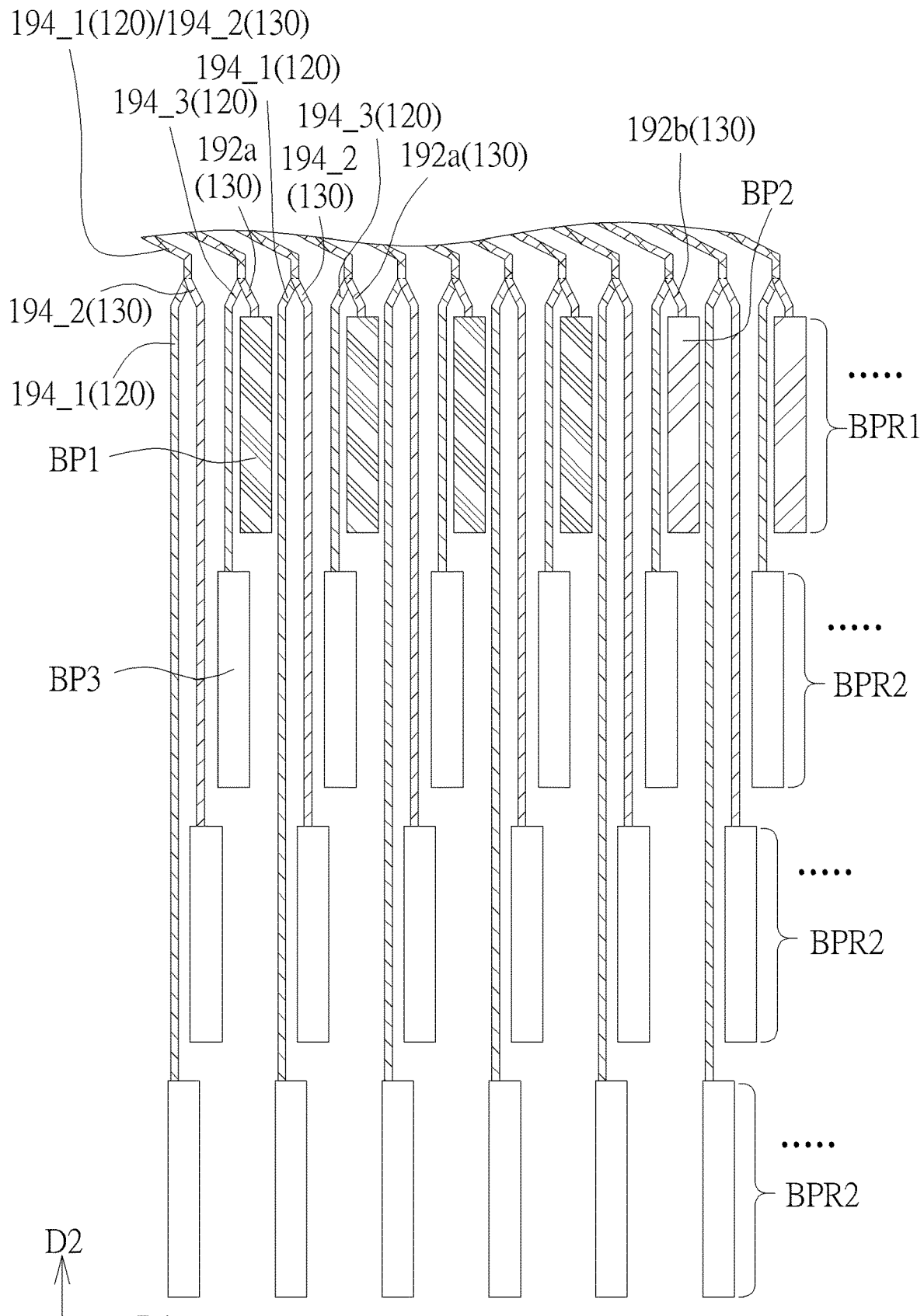

FIG. 15A and FIG. 15B are top-view schematic diagrams illustrating data lines, signal lines, first traces, second traces, touch sensing connecting pads, dummy connecting pads and source connecting pads according to another embodiment of the present invention. As shown in FIG. 15A, the first traces 192a are electrically connected to the touch signal lines 132a, the first traces 192b are electrically connected to the dummy signal lines 132b, the second traces 194 are electrically connected to the data lines DL, and the touch signal lines 132a, the dummy signal lines 132b and the data lines DL situated in the active region AR are formed of the second conductive layer 130. In order to shrink the total occupied area of the first traces 192 and the second traces 194 situated in the periphery region PR, two adjacent second traces 194 may be respectively formed from the first conductive layer 120 and the second conductive layer 130, one of the first traces 192a and one of the second traces 194 adjacent to this first trace 192a may be respectively formed of the first conductive layer 120 and the second conductive layer 130, and/or one of the first traces 192b and one of the second traces 194 adjacent to this first trace 192b may be respectively formed of the first conductive layer 120 and the second conductive layer 130, such that two adjacent second traces 194, the first trace 192a and the second trace 194 which are adjacent and/or the first trace 192b and the second trace 194 which are adjacent may partially overlap, thereby shrinking the total occupied area of the first traces 192a, 192b and the second traces 194 situated in the periphery region PR. As shown in FIG. 15A and FIG. 15B, the second trace 194_1 (which is electrically connected to the data line DL1) includes a first part 194_1a formed of the second conductive layer 130 and a second part 194_1b formed of the first conductive layer 120, and the first part 194_1a partially overlaps the second part 194_1b (the overlapping region is at the right portion of the second part 194_1b, and annotated as 194_1b (120)/194_1a (130) in FIG. 15A). The insulating layer covering the first part 194_1a and the second part 194_1b has at least one first through-hole THa and at least one second through-hole THb, wherein the first through-hole THa exposes a portion of the first part 194_1a, and the second through-hole THb exposes a portion of the second part 194_1b. The second transparent conductive layer 170 further includes a bridging electrode 176 covering the corresponding first through-hole THa and the corresponding second through-hole THb. The bridging electrode 176 is filled into the corresponding first through-hole THa to be in contact with the first part 194_1a exposed by the corresponding first through-hole THa, and filled into the corresponding second through-hole THb to be in contact with the second part 194_1b exposed by the corresponding second through-hole THb. In other words, the second trace 194_1 is transferred from the second conductive layer 130 to the first conductive layer 120 by a conductive transferring structure formed of the first through-hole THa, the second through-hole THb and the bridging electrode 176. The adjacent second trace 194_2 (which is electrically connected to the data line DL2) is formed of the second conductive layer 130. Therefore, two adjacent second traces 194_1, 194_2 may overlap with each other (annotated as 194_1 (120)/194_2(130) in FIG. 15A and FIG. 15B) and extend to a region close to connecting pads (first conductive connecting pads BP1, second conductive connecting pads BP2 and third conductive connecting pads BP3), and respectively extend to the corresponding third conductive connecting pads BP3 without overlap. Similarly, the second traces 194_3 (which are electrically connected to the data line DL3) are transferred from the second conductive layer 130 to the first conductive layer 120 by a conductive transferring structure formed of the first through-hole THa, the second through-hole THb and the bridging electrode 176, and the adjacent first trace 192a (or 192b) is formed of the second conductive layer 130. Therefore, the second traces 194_3 and the first traces 192a (or 192b) which are adjacent to each other may extend to the region close to the connecting pads with overlap (shown as 194_3(120)/192a(130) or 194_3 (120)/192b(130) in FIG. 15A), and respectively extend to the corresponding third conductive connecting pad BP3 and the corresponding first conductive connecting pad BP1 (or the corresponding second conductive connecting pad BP2) without overlap. In the above embodiment, the touch signal lines 132a, the dummy signal lines 132b and the data lines DL situated in the active region AR are formed of the second conductive layer 130, the first traces 192a, 192b and some of the second traces 194 (i.e. 194_2) situated in the periphery region PR are formed of the second conductive layer 130, and the others second traces 194 (i.e. 194_1 and 194_3) situated in the periphery region PR are transferred from the second conductive layer 130 to the first conductive layer 120 by the conductive transferring structures, but not limited thereto. In a modification, some of the second traces 194 (i.e. 194_1 and 194_3) situated in the periphery region PR are formed of the second conductive layer 130, and the other second traces 194 (i.e. 194_2) and the first traces 192a, 192b are transferred from the second conductive layer 130 to the first conductive layer 120 by the conductive transferring structures. As a result, the touch signal lines 132a, the dummy signal lines 132b and the data lines DL situated in the active region AR are formed of the second conductive layer 130, and some of the traces situated in the periphery region PR are transferred from the second conductive layer 130 to the first conductive layer 120 by the conductive transferring structures, such that two adjacent second traces 194, the first trace 192a and the second trace 194 which are adjacent and/or the first trace 192b and the second trace 194 which are adjacent may partially overlap each other. In addition, the conductive transferring structure of the present invention is not limited to be formed from the first through-hole THa, the second through-hole THb and the bridging electrode 176. In a modification, the insulating layer situated between the first part 194_1a and the second part 194_1b has at least one through-hole, wherein this through-hole exposes a portion of the second part 194_1b, and the first part 194_1a extends into this through-hole to be electrically connected to the second part 194_1b. Thus, the second trace 194_1 may be transferred from the second conductive layer 130 to the first conductive layer 120 by this through-hole.

As shown in FIG. 15B, the first, second and third conductive connecting pads BP1, BP2, BP3 (also respectively called the touch sensing connecting pads BP1, the dummy connecting pads BP2 and the source connecting pads BP3) are disposed on the substrate 110, wherein the positions of these connecting pads correspond to the pads of the integrated circuit IC. In this embodiment, since each three data lines DL correspond to one touch signal line 132a or one dummy signal line 132b, the number of the source connecting pads BP3 is three times the sum of the number of the touch sensing connecting pads BP1 and the number of the dummy connecting pads BP2. The touch sensing connecting pads BP1 and the dummy connecting pads BP2 may be arranged in a first pad row BPR1 along the first direction D1, and the source connecting pads BP3 may be arranged in at least one second pad row BPR2 along the first direction D1. In this embodiment, the first pad row BPR1 may be situated between the second pad row BPR2 and the active region AR, but not limited thereto. In a modification, the second pad row BPR2 may be situated between the first pad row BPR1 and the active region AR. Furthermore, in FIG. 15B, the touch sensing connecting pads BP1 and the dummy connecting pads BP2 in the first pad row BPR1 may partially overlap the source connecting pads BP3 in the adjacent second pad row BPR2 along the second direction D2, and the source connecting pads BP3 in two adjacent second pad rows BPR2 may partially overlap each other along the second direction D2, but not limited thereto. In a modification, the connecting pads in two adjacent pad rows may not overlap along the second direction D2. In the embodiment shown in FIG. 15A and FIG. 15B, the touch display device includes the dummy signal lines 132b and the dummy connecting pads BP2, but the present invention is not limited thereto. In an embodiment where the touch display device does not include the dummy signal line and the dummy connecting pad, the dispositions of the first traces, the second traces, the touch sensing connecting pads and the source connecting pads may refer to those shown in FIG. 15A and FIG. 15B and repeated description is omitted here, such that two adjacent second traces and/or the first trace and the second trace which are adjacent may partially overlap, which shrinks the total occupied area of the first traces and the second traces situated in the periphery region.

Referring to FIG. 16 and further referring to FIG. 1 and FIG. 2, FIG. 16 is atop-view schematic diagram illustrating the sub-pixels and one touch electrode according to an embodiment of the present invention, wherein FIG. 16 omits the structures within the sub-pixels SP and omits the slit 172a and the strip electrodes 172f of the touch electrode 172, and simplifies the sub-pixels SP and the touch electrode 172 into a rectangular shape. As shown in FIG. 1, FIG. 2 and FIG. 16, the touch electrodes 172 of the touch display device 100 may be arranged in an M×N array, and one of the touch electrodes 172 may correspond to a plurality of the sub-pixels SP (i.e. correspond to a plurality of the pixel electrodes 152); for instance, one touch electrode 172 corresponds to m×n sub-pixels SP. A length-breadth ratio of the touch electrode 172 is greater than or equal to 1 and less than or equal to 1.3, wherein the length of the touch electrode 172 is a dimension of the touch electrodes 172 along the second direction D2, and the breadth of the touch electrodes 172 is a dimension of the touch electrodes 172 along the first direction D1 (referring to FIG. 16), but not limited thereto. In an embodiment, if the touch display device 100 has 720×1280 pixels P (the length-breadth ratio of the active region AR of the touch display device 100 is 16:9) and 576 touch electrodes 172, the touch electrodes 172 may be arranged in an 18×32 array, wherein one of the touch electrodes 172 may correspond to 40×40 ((720÷18)×(1280÷32)) pixels P, and one of the touch electrodes 172 may correspond to 120×40 sub-pixels SP (i.e. one pixel P is composed of three sub-pixels SP). Assuming that the length-breadth ratio of the sub-pixel SP is 3:1 (that is, in FIG. 16, the ratio of the dimension of the sub-pixel SP along the second direction D2 to the dimension of the sub-pixel SP along the first direction D1 is 3:1), the length-breadth ratio of the touch electrode 172 is about 1. In another embodiment, if the touch display device 100 has 720×1440 pixels P (the length-breadth ratio of the active region AR of the touch display device 100 is 18:9) and 576 touch electrodes 172, and the touch electrodes 172 may be arranged in an 18×32 array, one of the touch electrodes 172 may correspond to 40×45 ((720÷18)×(1440÷32)) pixels P, and one of the touch electrodes 172 may correspond to 120×45 sub-pixels SP. Assuming that the length-breadth ratio of the sub-pixel SP is 3:1, the length-breadth ratio of the touch electrode 172 is about 1.125. In still another embodiment, if the touch display device 100 has 720×1480 pixels P (the length-breadth ratio of the active region AR of the touch display device 100 is 18.5:9) and 576 touch electrodes 172, and the touch electrodes 172 may be arranged in an 18×32 array, one of the touch electrodes 172 in the first row and the 32$^{th}$ row may correspond to 40×50 pixels P, and one of the touch electrodes 172 in the second row to the 31$^{st}$ row may correspond to 40×46 pixels P. Assuming that the length-breadth ratio of the sub-pixel SP is 3:1, the length-breadth ratio of one of the touch electrodes 172 in the first row and the 32$^{nd}$ row is about 1.25, and the length-breadth ratio of one of the touch electrodes 172 in the second row to the 31$^{st}$ row is about 1.15. The arrangement of the touch electrodes 172, the disposition of the sub-pixels SP and the length-breadth ratio of the touch electrode 172 are not limited thereto. The length-breadth ratio of the active region AR of the touch display device 100 may be another value, such as 19:9 or 20:9. As a result, in the embodiment where the length-breadth ratio of the active region AR of the touch display device 100 is greater than or equal to 2:1, the length-breadth ratio of the touch electrode 172 is preferably greater than 1 and less than 1.3.

Figure 17A:
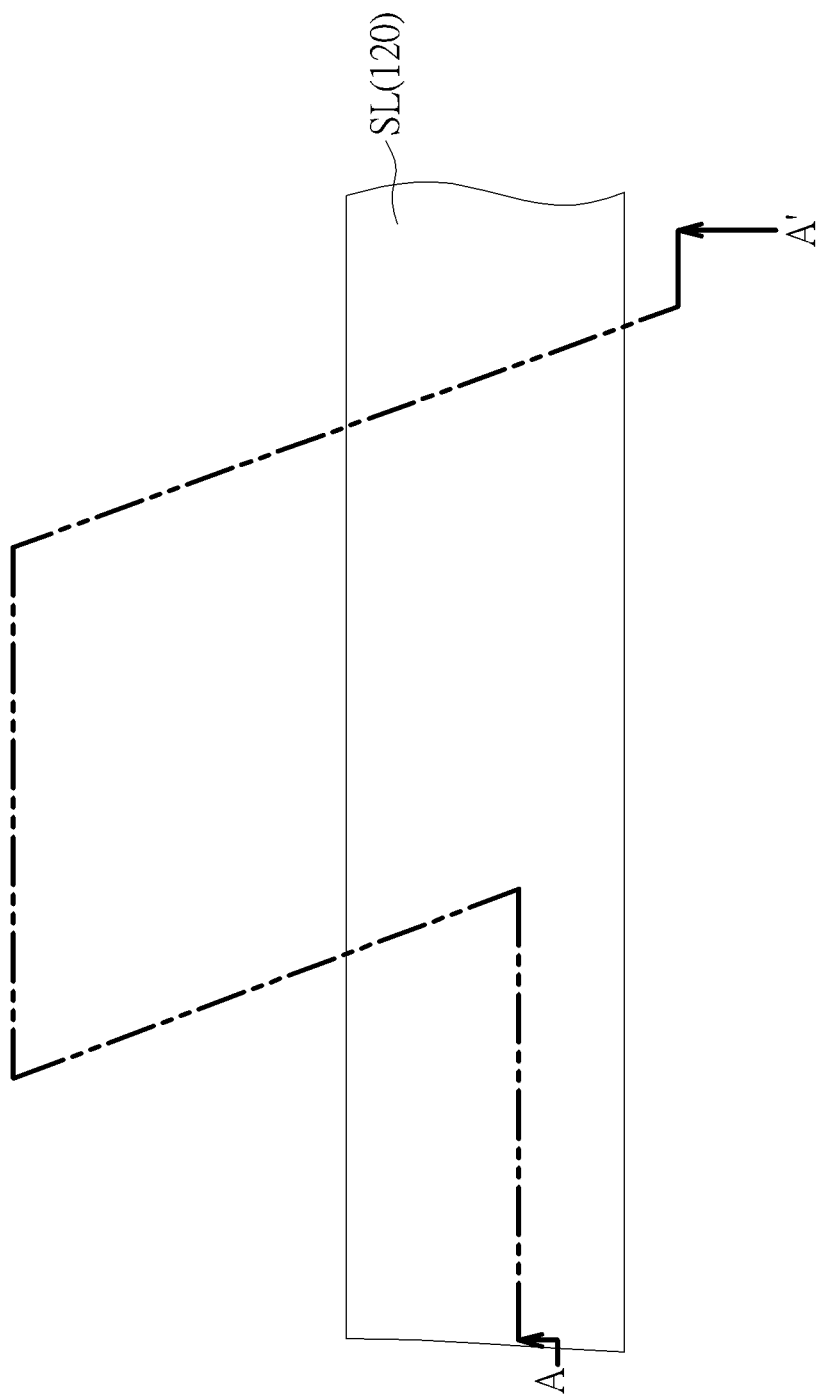
FIG. 17A, FIG. 18A, FIG. 19A, FIG. 20A and FIG. 21A are schematic diagrams illustrating a manufacturing process of the touch display device according to the first embodiment of the present invention.
Figure 17B:
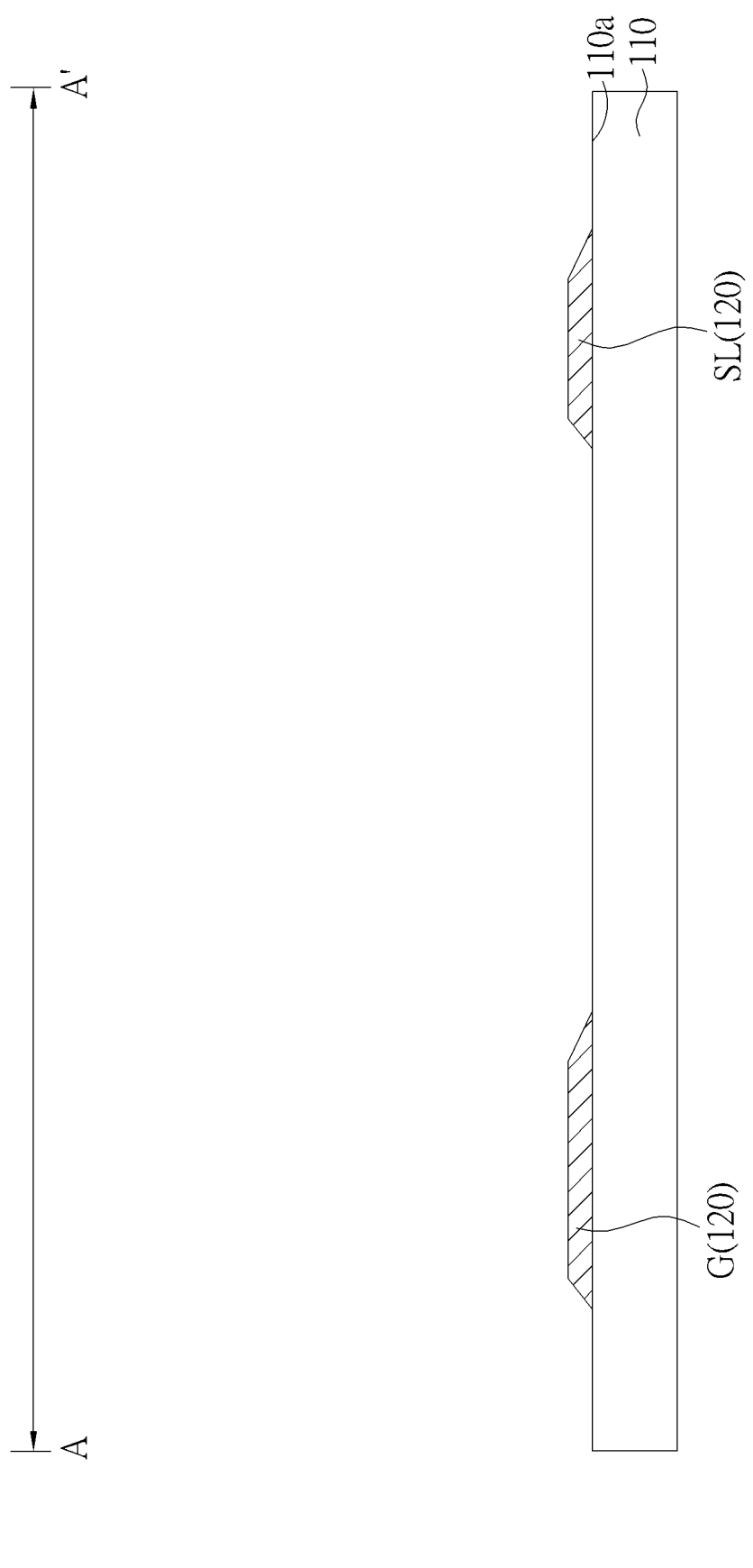
FIG. 17B, FIG. 18B, FIG. 19B, FIG. 20B and FIG. 21B are cross-sectional view schematic diagrams taken the along cross-sectional line AA' in FIG. 17A, FIG. 18A, FIG. 19A, FIG. 20A and FIG. 21A respectively.
Figure 18A:
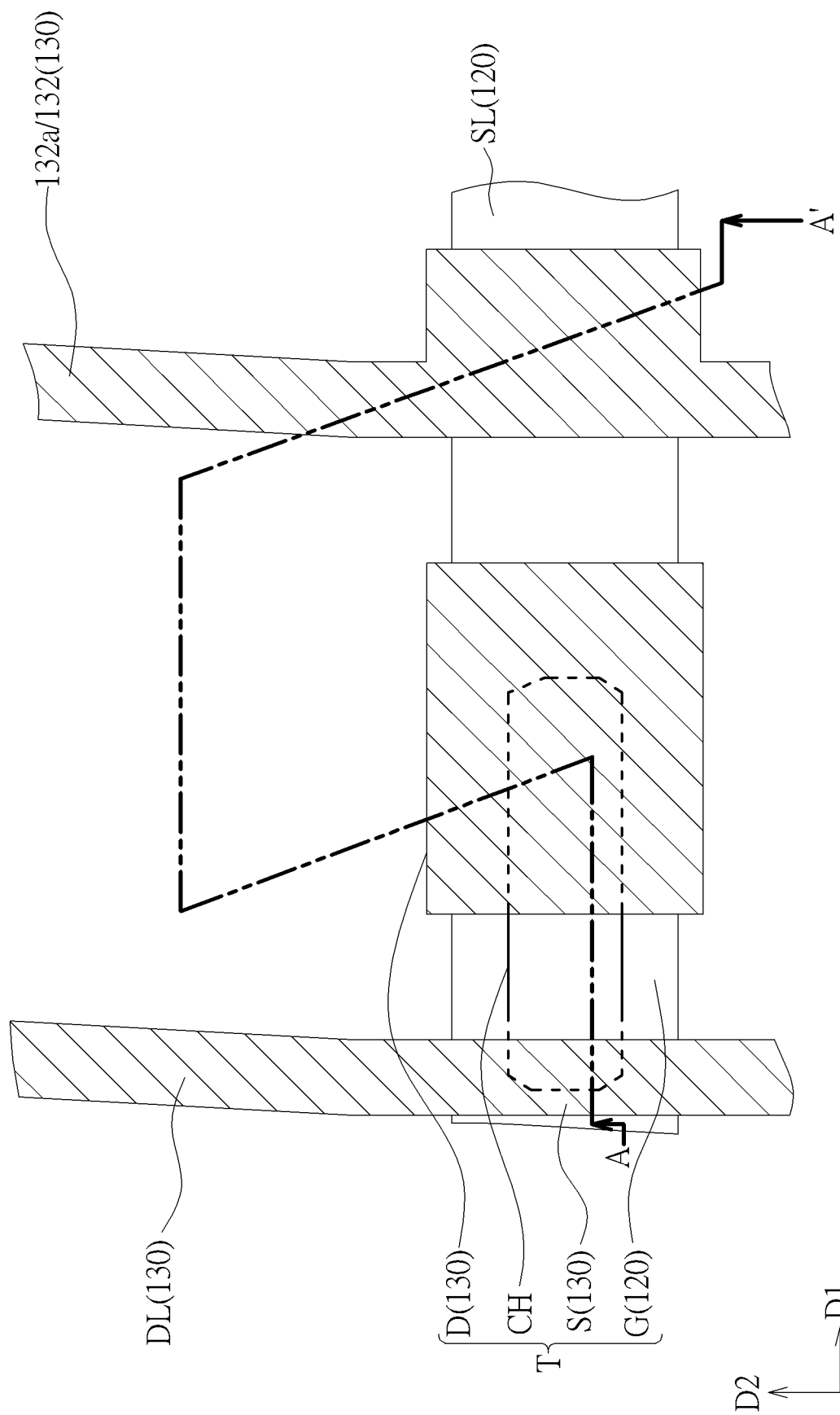
Figure 18B:
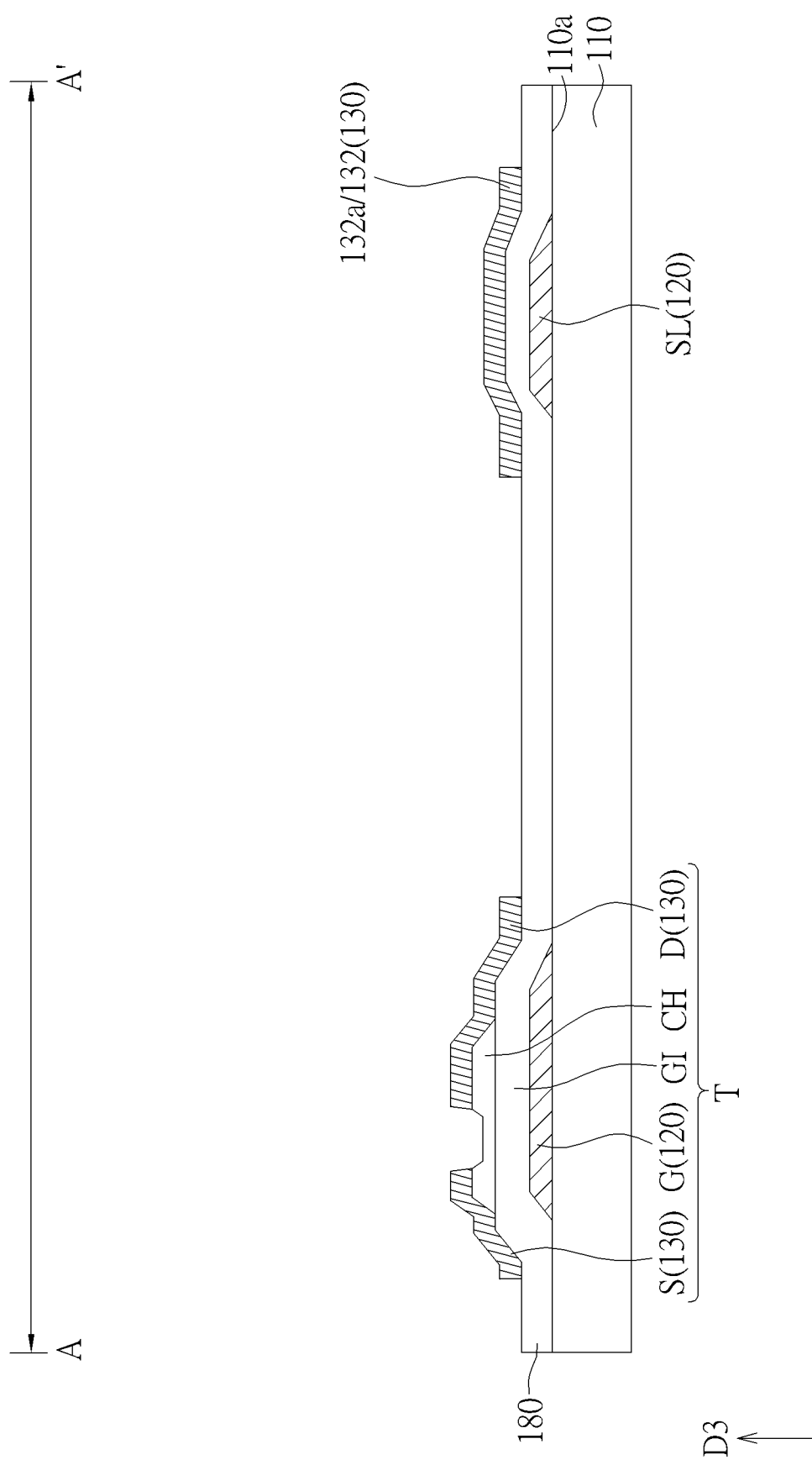
Figure 19A:
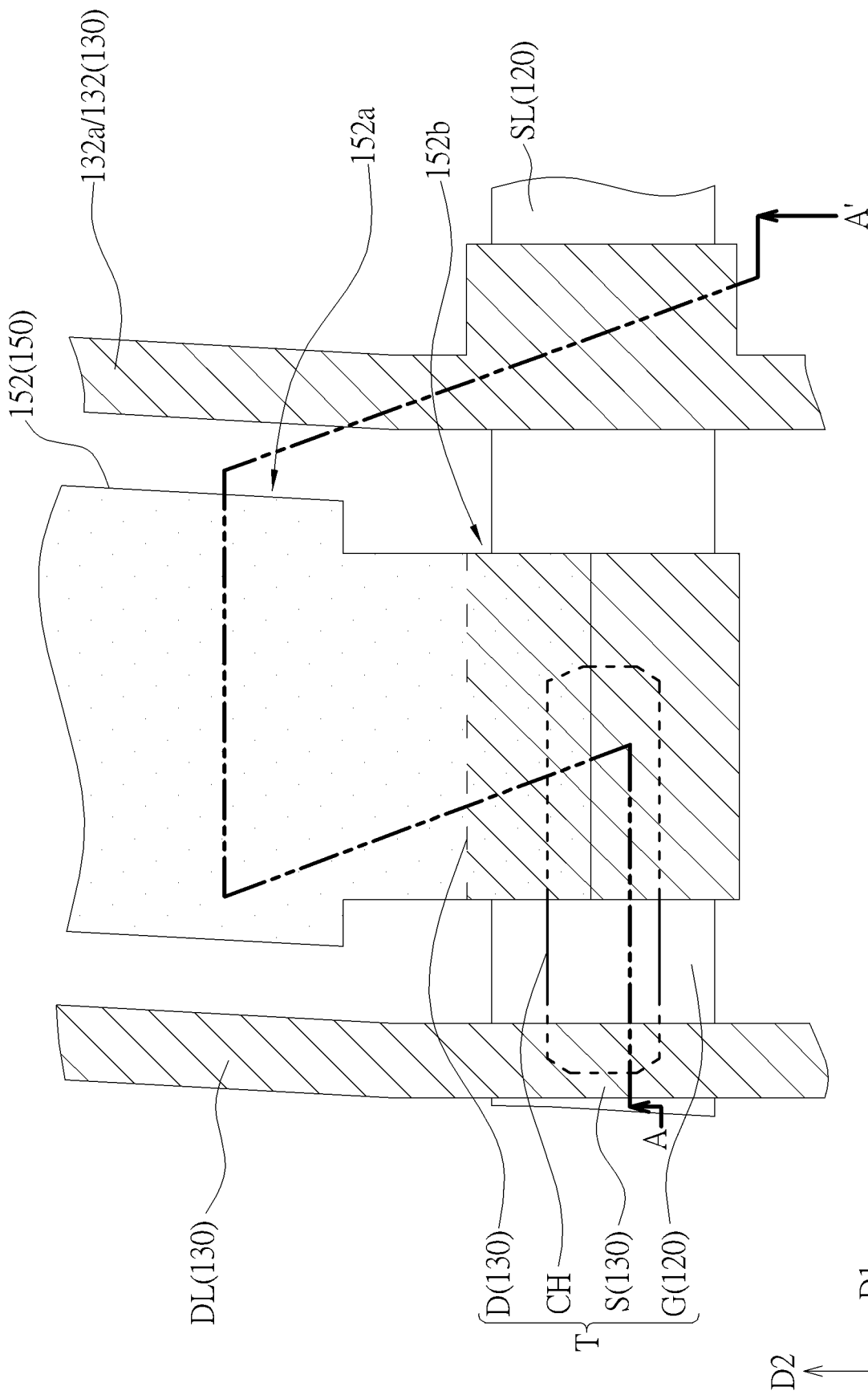
Figure 19B:
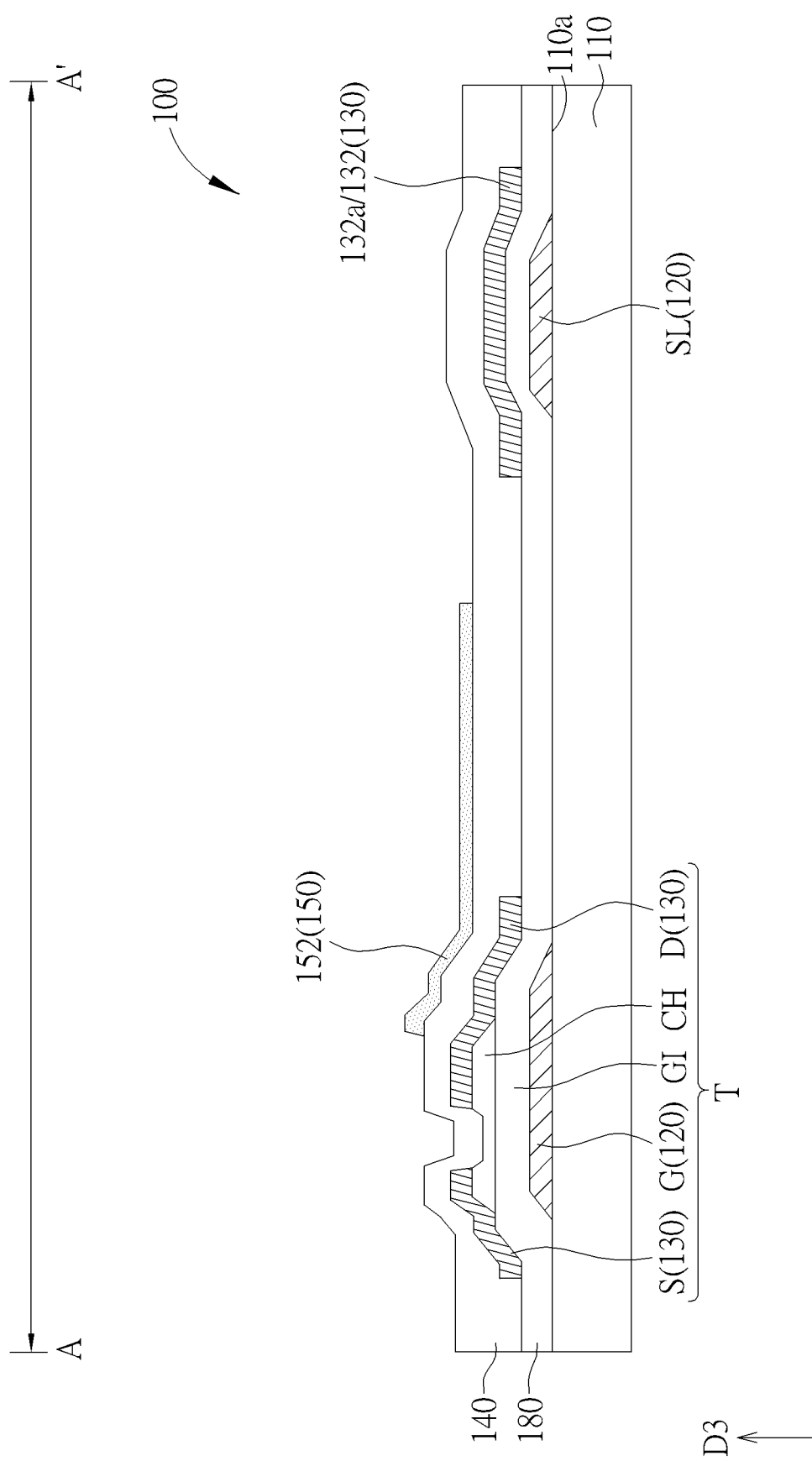
Figure 20A:
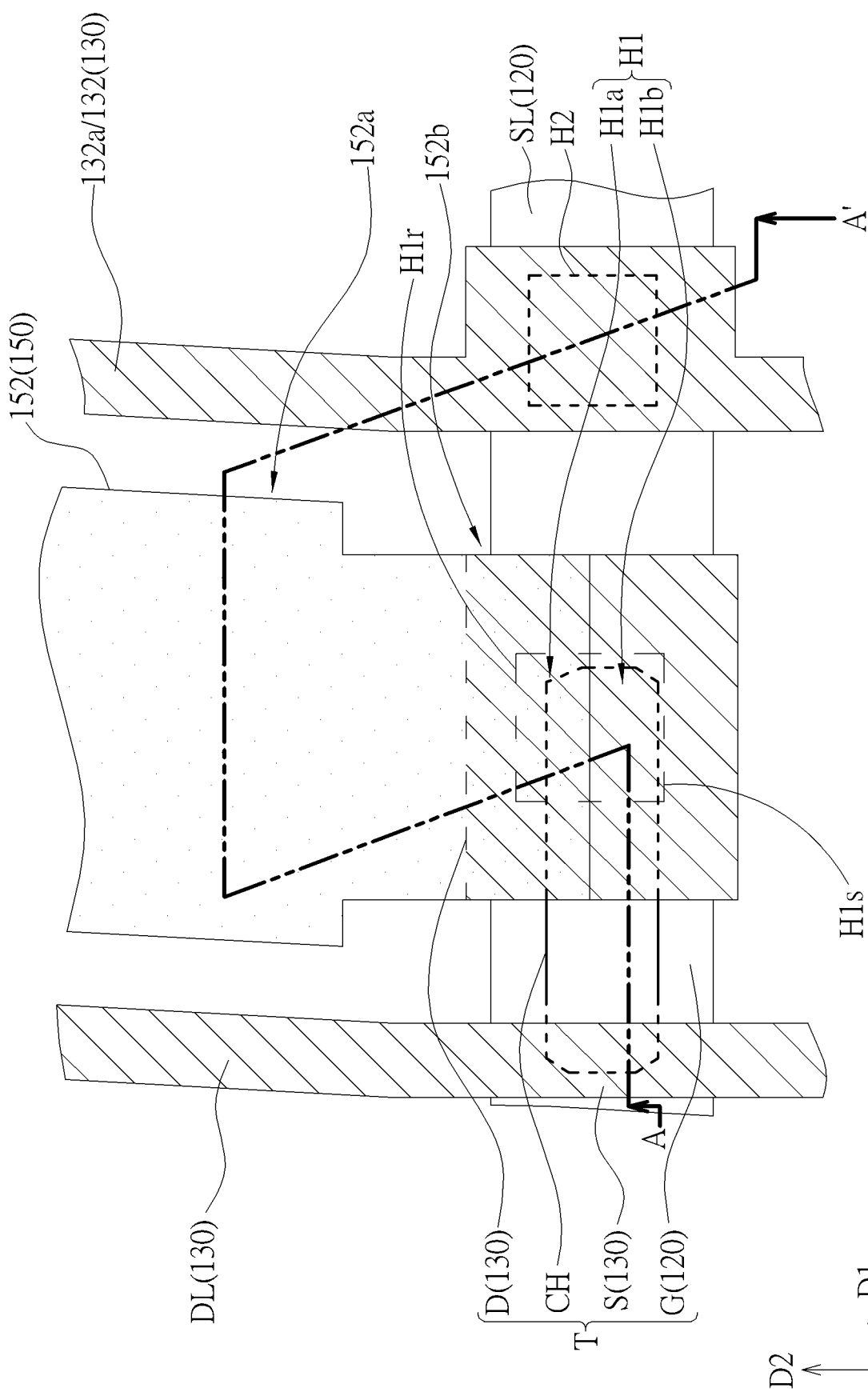
Figure 20B:
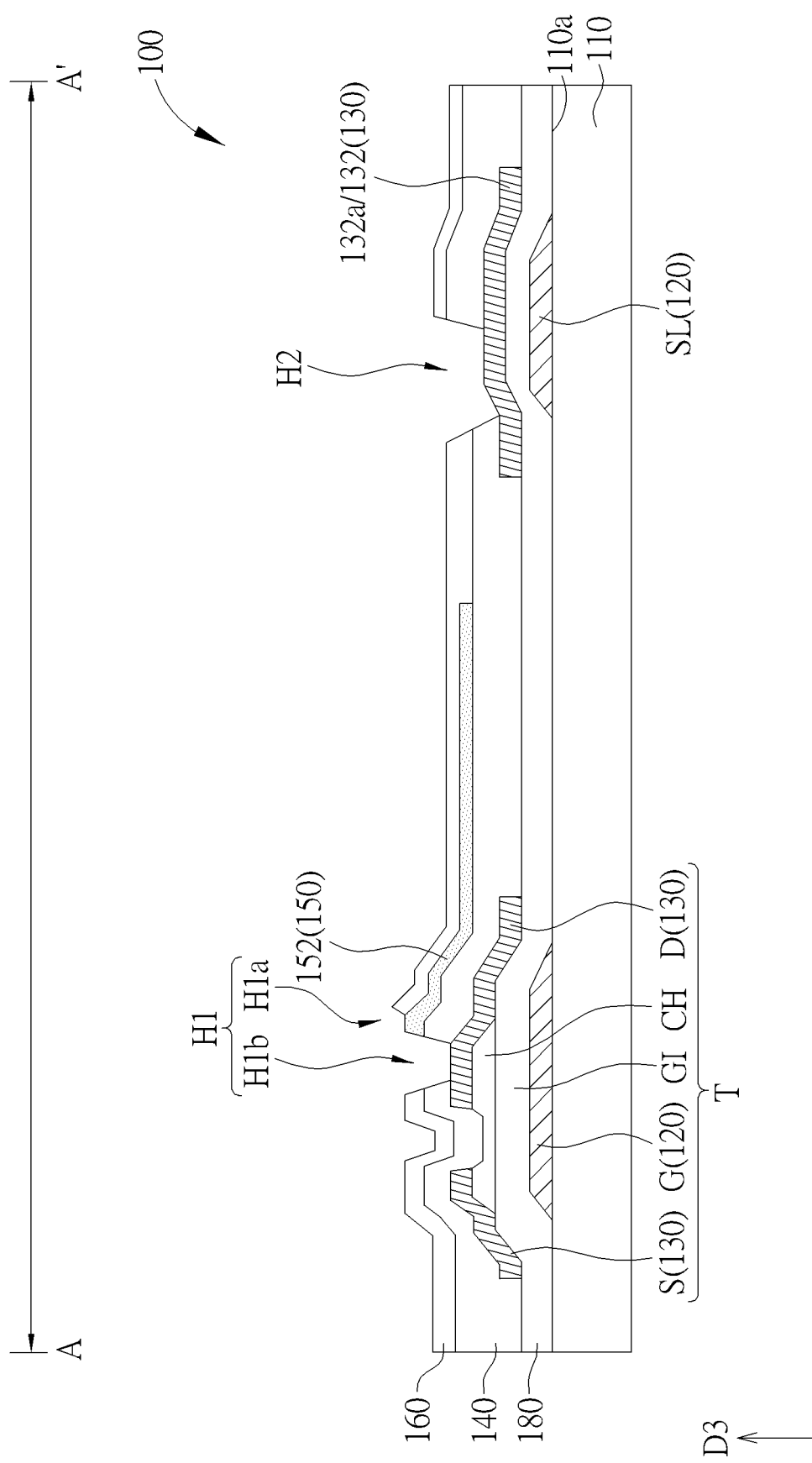
Figure 21A:
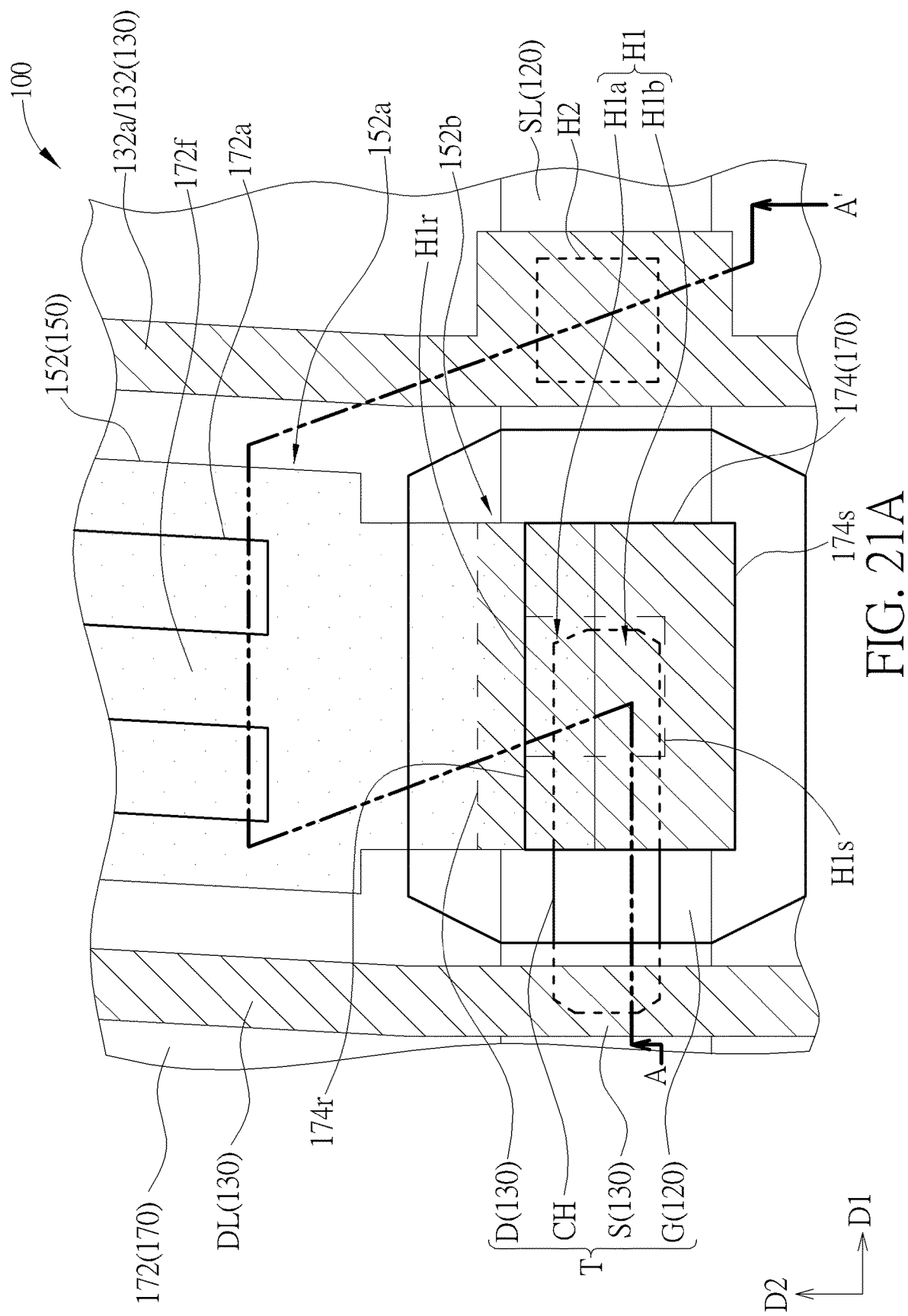
Figure 21B:
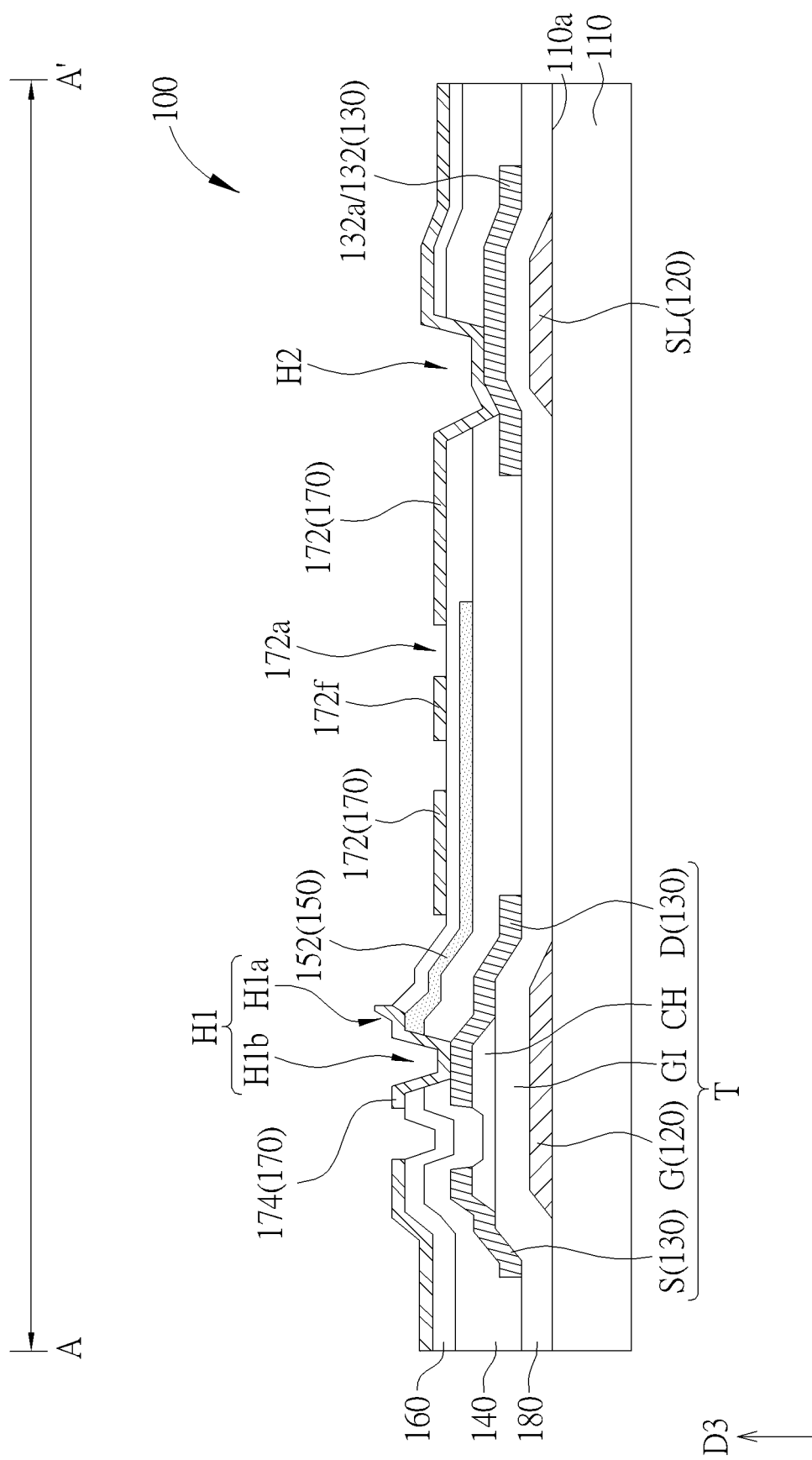

FIG. 17A, FIG. 18A, FIG. 19A, FIG. 20A and FIG. 21A are schematic diagrams illustrating a manufacturing process of the touch display device according to the first embodiment of the present invention, and FIG. 17B, FIG. 18B, FIG. 19B, FIG. 20B and FIG. 21B are cross-sectional view schematic diagrams taken the along cross-sectional line AA' respectively in FIG. 17A, FIG. 18A, FIG. 19A, FIG. 20A and FIG. 21A. As shown in FIG. 17A and FIG. 17B, the first conductive layer 120 is formed on the substrate 110 (not shown in FIG. 17A). The first conductive layer 120 includes the scan lines SL and the gates G. As shown in FIG. 18A and FIG. 18B, the third insulating layer 180 (not shown in FIG. 18A), the semiconductor layer CH and the second conductive layer 130 are formed. The second conductive layer 130 includes the data lines DL, the touch signal lines 132a, the dummy signal lines 132b, the sources S and the drains D. Therefore, in FIG. 17A and FIG. 18A, the touch signal lines 132a and the thin film transistors T each including the gate G, the source S, the drain D and the semiconductor layer CH are formed on the substrate 110, wherein the data lines DL, the touch signal lines 132a, the dummy signal lines 132b, the sources S and the drains D are formed of the same layer. As shown in FIG. 19A and FIG. 19B, the first insulating layer 140 (not shown in 19A) is formed on the thin film transistors T and the touch signal lines 132a, and the first transparent conductive layer 150 is formed on the first insulating layer 140. The first transparent conductive layer 150 includes the pixel electrodes 152, wherein each of the pixel electrodes 152 includes the connecting portion 152b and the display portion 152a, and the connecting portion 152b partially overlaps one drain D along the vertical projection direction. As shown in FIG. 20A and FIG. 20B, the second insulating layer 160 is formed on the first transparent conductive layer 150 and the first insulating layer 140; then, a portion of the first insulating layer 140 and a portion of the second insulating layer 160 are removed to form the first connecting holes H1 and the second connecting holes H2, wherein each of the first connecting holes H1 exposes a portion of one pixel electrode 152 and a portion of one drain D, and each of the second connecting holes H2 exposes a portion of one touch signal line 132a. In FIG. 20A and FIG. 20B, the first connecting holes H1 and the second connecting holes H2 may be formed in the same process step, so as to reduce the manufacturing step and the cost. As shown in FIG. 21A and FIG. 21B, the second transparent conductive layer 170 is formed on the second insulating layer 160. The second transparent conductive layer 170 includes the touch electrodes 172 and the connecting electrodes 174, the connecting electrodes 174 are electrically insulated from the touch electrodes 172, each of the connecting electrodes 174 extends into one of the first connecting holes H1, and each of the touch electrodes 172 extends into at least one of the second connecting holes H2. Each of the connecting electrodes 174 is electrically connected to one of the drains D and one of the pixel electrodes 152, and each of the touch electrodes 172 is electrically connected to at least one of the touch signal lines 132a. In this embodiment, the first connecting holes H1 and the second connecting holes H2 may be formed by one photo-etching-process, but not limited thereto. In a modification, the first connecting holes H1 and the second connecting holes H2 may be formed by two or more manufacturing processes; for instance, if the first insulating layer 140 includes a non-photosensitive insulating material layer and a photosensitive insulating material layer (such as photosensitive resin layer) which are stacked from bottom to top in sequence (that is, the first insulating layer 140 is a double-layer structure), after forming the first insulating layer 140, a portion of the photosensitive insulating material layer is removed to expose a portion of the non-photosensitive insulating material layer by one photo-process; then, after forming the second insulating layer 160, a portion of the second insulating layer 160 and a portion of the non-photosensitive insulating material layer are removed to form the first connecting holes H1 and the second connecting holes H2.

In the manufacturing method of the touch display device 100 of this embodiment, the first conductive layer 120 may be patterned by using a first photomask, to form the scan lines SL and the gates G. The semiconductor layer CH may be patterned by using a second photomask. The second conductive layer 130 may be patterned by using a third photomask to form the data lines DL, the touch signal lines 132a, the dummy signal lines 132b, the sources S and the drains D. The first transparent conductive layer 150 may be patterned by using a fourth photomask to form the pixel electrodes 152. A portion of the first insulating layer 140 and a portion of the second insulating layer 160 may be removed by using a fifth photomask, to form the first connecting holes H1 and the second connecting holes H2. The second transparent conductive layer 170 may be patterned by using a sixth photomask to form the touch electrodes 172 and the connecting electrodes 174. The number of used photomasks is not limited thereto.

In summary, the touch display device of the present invention can reduce the distance between the touch electrode and the pixel electrode under the condition that the load between the data line and the touch electrode is not increased, so as to increase the capacitance of the storage capacitor formed of the touch electrode and the pixel electrode. Also, compared with the conventional touch display device, the manufacturing processes may be simplified and the number of layers in the touch display device may be decreased, so as to reduce the manufacturing cost. Moreover, the aperture ratio of the sub-pixel may be enhanced by the design of the connecting electrode. The electrical connection formed of the connecting electrode may not be influenced under the condition that the first connecting hole has the undercut structure.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A touch display device, comprising:
a substrate;
a plurality of thin film transistors disposed on the substrate, each of the thin film transistors comprising a gate, a source and a drain;
a plurality of touch signal lines disposed on the substrate;
a first insulating layer disposed on the thin film transistors and the touch signal lines;
a first transparent conductive layer disposed on the first insulating layer, the first transparent conductive layer comprising a plurality of pixel electrodes;
a second insulating layer disposed on the first insulating layer and the first transparent conductive layer;
a plurality of first connecting holes situated in the first insulating layer and the second insulating layer, each of the first connecting holes exposing a portion of one of the pixel electrodes and a portion of one of the drains;
a plurality of second connecting holes situated in the first insulating layer and the second insulating layer, each of the second connecting holes exposing a portion of one of the touch signal lines; and
a second transparent conductive layer disposed on the second insulating layer, the second transparent conductive layer comprising a plurality of touch electrodes and a plurality of connecting electrodes, each of the connecting electrodes extending into one of the first connecting holes, each of the touch electrodes extending into at least one of the second connecting holes, the connecting electrodes being electrically insulated from the touch electrodes;
wherein each of the connecting electrodes is electrically connected to one of the drains and one of the pixel electrodes, and each of the touch electrodes is electrically connected to at least one of the touch signal lines.
2. The touch display device of claim 1, wherein the touch signal lines and the drains of the thin film transistors are formed of a same layer.

3. The touch display device of claim 1, wherein each of the first connecting holes comprises a first portion and a second portion, in each of the first connecting holes, the first portion exposes the portion of the pixel electrode, the second portion exposes the portion of the drain, and the first portion is situated at a side of the second portion.

4. The touch display device of claim 1, wherein each of the first connecting holes comprises a first portion and a second portion, in each of the first connecting holes, the first portion exposes the portion of the pixel electrode, the second portion exposes the portion of the drain, and an area of the first connecting holes is greater than or equal to twice an area of the first portion.

5. The touch display device of claim 1, wherein at least one of the first connecting holes has an undercut structure.

6. The touch display device of claim 1, further comprising a third insulating layer disposed between the substrate and the first insulating layer, wherein a thickness of the first insulating layer is greater than a thickness of the third insulating layer, and the thickness of the third insulating layer is greater than a thickness of the second insulating layer.

7. The touch display device of claim 6, wherein the thickness of the first insulating layer ranges from 4000 Å to 7000 Å, the thickness of the second insulating layer ranges from 1500 Å to 3000 Å, and the thickness of the third insulating layer ranges from 3000 Å to 5000 Å.

8. The touch display device of claim 1, further comprising a plurality of dummy signal lines disposed on the substrate, wherein the dummy signal lines and the touch signal lines are formed of a same layer.

9. The touch display device of claim 8, wherein the dummy signal lines are floating or have a predetermined voltage.

10. The touch display device of claim 8, further comprising a plurality of data lines disposed on the substrate, wherein each of the data lines is electrically connected to at least one of the sources, and the touch signal lines, the dummy signal lines and the data lines are formed of the same layer.

11. The touch display device of claim 10, wherein the gates of the thin film transistors are formed of a first conductive layer, and the drains and the sources of the thin film transistors, the data line, the touch signal lines and the dummy signal lines are formed of a second conductive layer.

12. The touch display device of claim 10, wherein three of the data lines are disposed between adjacent two of the touch signal lines and the dummy signal lines.

13. The touch display device of claim 12, wherein the touch display device has an active region and a peripheral region, and the touch display device further comprises a plurality of first traces and a plurality second traces situated in the peripheral region, wherein two of the first traces are respectively electrically connected to the adjacent two of the touch signal lines and the dummy signal lines, three of the second traces are respectively electrically connected to the three data lines, two of the three second traces are partially overlapped with each other, and one of the two first traces and the other of the three second traces are partially overlapped with each other.

14. The touch display device of claim 12, wherein the touch display device has an active region and a peripheral region, the touch display device further comprises a plurality of first traces, a plurality of second traces, a plurality of touch sensing connecting pads, a plurality of dummy connecting pads and a plurality of source connecting pads disposed in the peripheral region, each of the first traces is electrically connected between a corresponding one of the touch sensing connecting pads and a corresponding one of the touch signal lines, or between a corresponding one of the dummy connecting pads and a corresponding one of the dummy signal lines, and each of the second traces is electrically between a corresponding one of the source connecting pads and a corresponding one of the data lines, wherein the touch sensing connecting pads and the dummy connecting pads are arranged in a first pad row along a first direction, and the source connecting pads are arranged in at least one second pad row along the first direction.

15. The touch display device of claim 1, wherein the touch display device has an active region and a peripheral region, and when a length-breadth ratio of the active region of the touch display device is greater than or equal to 2:1, in each of the touch electrodes, a ratio of a length of the touch electrode to a breadth of the touch electrode is greater than 1 and less than 1.3.

16. A manufacturing method of a touch display device, comprising:
   forming a plurality of thin film transistors and a plurality of touch signal lines on a substrate, each of the thin film transistors comprising a gate, a source and a drain, wherein the touch signal lines and the drains are formed of a same layer;
   forming a first insulating layer on the thin film transistors and the touch signal lines;
   forming a first transparent conductive layer on the first insulating layer, the first transparent conductive layer comprising a plurality of pixel electrodes;
   forming a second insulating layer on the first transparent conductive layer and the first insulating layer;
   removing a portion of the first insulating layer and a portion of the second insulating layer for forming a plurality of first connecting holes and a plurality of second connecting holes, each of the first connecting holes exposing a portion of one of the pixel electrodes and a portion of one of the drains, each of the second connecting holes exposing a portion of one of the touch signal lines; and
   forming a second transparent conductive layer on the second insulating layer, the second transparent conductive layer comprising a plurality of touch electrodes and a plurality of connecting electrodes, the connecting electrodes being electrically insulated from the touch electrodes, each of the connecting electrodes extending into one of the first connecting holes, each of the touch electrodes extending into at least one of the second connecting holes, wherein each of the connecting electrodes is electrically connected to one of the drains and one of the pixel electrodes, and each of the touch electrodes is electrically connected to at least one of the touch signal lines.

17. The method of claim 16, wherein the step of forming the plurality of thin film transistors and the plurality of touch signal lines on the substrate comprises:
   forming a first conductive layer on the substrate, wherein the first conductive layer comprises the gates of the thin film transistors;
   forming a third insulating layer on the first conductive layer; and
   forming a second conductive layer on the third insulating layer, wherein the second conductive layer comprises the drains and the sources of the thin film transistors and the touch signal lines.

18. The method of claim 17, wherein the second conductive layer further comprises a plurality of dummy signal lines.

19. The method of claim 16, wherein the first connecting holes and the second connecting holes are formed by one photo-etching-process.

20. The method of claim 19, wherein at least one of the first connecting holes has an undercut situated in the first insulating layer.

* * * * *